US006876704B2

(12) United States Patent
LaRocca et al.

(10) Patent No.: US 6,876,704 B2
(45) Date of Patent: Apr. 5, 2005

(54) APPARATUS AND METHOD FOR ENCODING AND COMPUTING A DISCRETE COSINE TRANSFORM USING A BUTTERFLY PROCESSOR

(75) Inventors: Judith LaRocca, Carlsbad, CA (US); A. Chris Irvine, Bonsall, CA (US); Jeffrey A. Levin, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 849 days.

(21) Appl. No.: 09/876,789

(22) Filed: Jun. 6, 2001

(65) Prior Publication Data

US 2002/0181027 A1 Dec. 5, 2002

Related U.S. Application Data

(60) Provisional application No. 60/291,467, filed on May 16, 2001.

(51) Int. Cl.⁷ .................................................. H04N 7/12
(52) U.S. Cl. .................................................. 375/240.2
(58) Field of Search ........................ 375/240.2, 240.21, 375/240.24, 240.23; 364/725.01, 725, 726, 727; 382/248, 250; 348/395.1, 408.1; H04N 7/12

(56) References Cited

U.S. PATENT DOCUMENTS

| | | | | | |
|---|---|---|---|---|---|
| 5,592,399 A | * | 1/1997 | Keith et al. | .................. | 709/247 |
| 5,610,849 A | | 3/1997 | Huang | | |
| 5,684,534 A | * | 11/1997 | Harney et al. | ......... | 375/240.25 |
| 5,818,742 A | | 10/1998 | Fraenkel et al. | | |
| 6,366,585 B1 | * | 4/2002 | Dapper et al. | .............. | 370/409 |
| 6,397,240 B1 | * | 5/2002 | Fernando et al. | ........... | 708/603 |
| 6,687,315 B2 | * | 2/2004 | Keevill et al. | .............. | 375/341 |

FOREIGN PATENT DOCUMENTS

| | | |
|---|---|---|
| EP | 0424119 | 4/1991 |
| EP | 0566184 | 10/1993 |
| EP | 0714212 | 5/1996 |

OTHER PUBLICATIONS

Vaisey J. et al., "Image Compression with Variable Block Size Segmentation" IEE Transactions on Signal Processing, IEEE, Inc. New York, US, vol. 40, No. 8, Aug. 1, 1992, pp. 2040–2060.

Chen R–J et al., "A Fully Adaptive DCT Based Color Image Sequence Coder" Signal Processing. Image Communication, Elsevier Science Publishers, Amsterdam, NL, vol. 6, No. 4, Aug. 1, 1994, pp. 289–301.

Kato Y et al., "An Adaptive Orthogonal Transform Coding Algorithm for Images Utilizing Classification Technique" Electronics & Communications in Japan, Part I—Communications, Scripta Technica. New York, US, vol. 72, No. 5, Part 1, May 1, 1989, pp. 1–9.

* cited by examiner

Primary Examiner—Nhon Diep
(74) Attorney, Agent, or Firm—Sandip (Micky) S. Minhas; Phil Wadsworth

(57) ABSTRACT

An apparatus to determine a transform of a block of encoded data the block of encoded data comprising a plurality of data elements. An input register is configured to receive a predetermined quantity of data elements. At least one butterfly processor is coupled to the input register and is configured to perform at least one mathematical operation on selected pairs of data elements to produce an output of processed data elements. At least one intermediate register is coupled to the butterfly processor and configured to temporarily store the processed data. A feedback loop is coupled to the intermediate register and the butterfly processor, and where if enabled, is configured to transfer a first portion of processed data elements to the appropriate butterfly processor to perform additional mathematical operations and where if disabled, is configured to transfer a second portion of processed data elements to at least one holding register.

91 Claims, 12 Drawing Sheets

PQR DATA

APPARATUS AND METHOD FOR ENCODING AND COMPUTING A DISCRETE COSINE TRANSFORM USING A BUTTERFLY PROCESSOR

This application claims the benefit of priority of the U.S. Provisional Patent Application Ser. No. 60/291,467, filed May 16, 2001, which is incorporated herein by reference in its entirety.

BACKGROUND OF THE INVENTION

I. Field of the Invention

The present invention relates to digital signal processing. More specifically, the present invention relates to an apparatus and method for determining the transform of a block of encoded data.

II. Description of the Related Art

Digital picture processing has a prominent position in the general discipline of digital signal processing. The importance of human visual perception has encouraged tremendous interest and advances in the art and science of digital picture processing. In the field of transmission and reception of video signals, such as those used for projecting films or movies, various improvements are being made to image compression techniques. Many of the current and proposed video systems make use of digital encoding techniques. Aspects of this field include image coding, image restoration, and image feature selection. Image coding represents the attempts to transmit pictures of digital communication channels in an efficient manner, making use of as few bits as possible to minimize the band width required, while at the same time, maintaining distortions within certain limits. Image restoration represents efforts to recover the true image of the object. The coded image being transmitted over a communication channel may have been distorted by various factors. Source of degradation may have arisen originally in creating the image from the object. Feature selection refers to the selection of certain attributes of the picture. Such attributes may be required in the recognition, classification, and decision in a wider context.

Digital encoding of video, such as that in digital cinema, is an area which benefits from improved image compression techniques. Digital image compression may be generally classified into two categories: loss-less and lossy methods. A loss-less image is recovered without any loss of information. A lossy method involves an irrecoverable loss of some information, depending upon the compression ratio, the quality of the compression algorithm, and the implementation of the algorithm. Generally, lossy compression approaches are considered to obtain the compression ratios desired for a cost-effective digital cinema approach. To achieve digital cinema quality levels, the compression approach should provide a visually loss-less level of performance. As such, although there is a mathematical loss of information as a result of the compression process, the image distortion caused by this loss should be imperceptible to a viewer under normal viewing conditions.

Existing digital image compression technologies have been developed for other applications, namely for television systems. Such technologies have made design compromises appropriate for the intended application, but do not meet the quality requirements needed for cinema presentation.

Digital cinema compression technology should provide the visual quality that a moviegoer has previously experienced. Ideally, the visual quality of digital cinema should attempt to exceed that of a high-quality release print film. At the same time, the compression technique should have high coding efficiency to be practical. As defined herein, coding efficiency refers to the bit rate needed for the compressed image quality to meet a certain qualitative level. Moreover, the system and coding technique should have built-in flexibility to accommodate different formats and should be cost effective; that is, a small-sized and efficient decoder or encoder process.

One compression technique capable of offering significant levels of compression while preserving the desired level of quality utilizes adaptively sized blocks and sub-blocks of encoded Discrete Cosine Transform (DCT) coefficient data. Although DCT techniques are gaining wide acceptance as a digital compression method, efficient hardware implementation has been difficult.

SUMMARY OF THE INVENTION

The invention provides for efficient hardware implementation of adaptive block sized DCT encoded data. An apparatus to determine a transform of a block of encoded data the block of encoded data comprising a plurality of data elements. An input register is configured to receive a predetermined quantity of data elements. At least one butterfly processor is coupled to the input register and is configured to perform at least one mathematical operation on selected pairs of data elements to produce an output of processed data elements. At least one intermediate register is coupled to the butterfly processor and configured to temporarily store the processed data. A feedback loop is coupled to the intermediate register and the butterfly processor, and where if enabled, is configured to transfer a first portion of processed data elements to the appropriate butterfly processor to perform additional mathematical operations and where if disabled, is configured to transfer a second portion of processed data elements to at least one holding register.

Accordingly, it is an aspect of an embodiment to provide a processor that efficiently implements discrete cosine transform (DCT) and discrete quadtree transform (DQT) techniques.

It is another aspect of an embodiment to provide a processor that efficiently implements inverse discrete cosine transform (IDCT) and inverse discrete quadtree transform (IDQT) techniques.

It is another aspect of an embodiment to implement a processor that is flexible in that the same hardware components may be reconfigured to compute different mathematical operations within the same transform trellis.

It is another aspect of an embodiment to provide an image processor that maintains a high quality image while minimizing image distortion.

It is another aspect of an embodiment to process portions of encoded data in parallel.

It is another aspect of an embodiment to process read, write, and butterfly operations in a single clock cycle.

It is another aspect of an embodiment to provide and implement a control sequencer having the variability to control different block sizes of data and maintain the speed necessary for real-time processing.

It is another aspect of an embodiment to implement a processor such that the processor is configurable to operate on variable block sizes.

BRIEF DESCRIPTION OF THE DRAWINGS

The aspects, features, objects, and advantages of the invention will become more apparent from the detailed description set forth below when taken in conjunction with the drawings in which like reference characters identify correspondingly throughout and wherein:

FIG. 11b illustrates the corresponding quad-tree decomposition for the block size assignment of FIG. 11a; and FIG. 11c illustrates a corresponding PQR data for the block size assignment of FIG. 11a.

DETAILED DESCRIPTION OF THE PREFERRED EMBODIMENTS

Figure 1A:
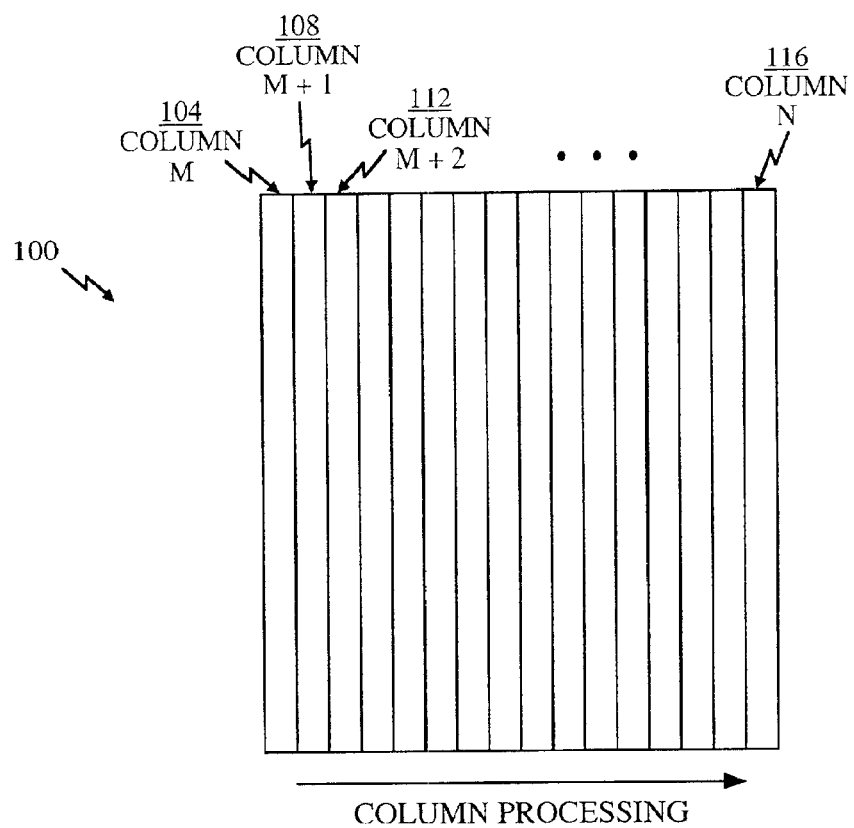
FIG. 1 is a block diagram of column and row processing of a block of data.

In order to facilitate digital transmission of digital signals and enjoy the corresponding benefits, it is generally necessary to employ some form of signal compression. To achieve high definition in a resulting image, it is also important that the high quality of the image be maintained. Furthermore, computational efficiency is desired for compact hardware implementation, which is important in many applications.

Accordingly, spatial frequency-domain techniques, such as Fourier transforms, wavelet, and discrete cosine transforms (DCT) generally satisfy the above criteria. The DCT has energy packing capabilities and approaches a statistical optimal transform in decorellating a signal. The development of various algorithms for the efficient implementation of DCT further contributes to its mainstream applicability.

The reduction and computational complexity of these algorithms and its recursive structure results in a more simplified hardware scheme. DCTs are generally orthogonal and separable. The fact that DCTs are orthogonal implies that the energy, or information, of a signal is preserved under transformation; that is, mapping into the DCT domain. The fact that DCTs are separable implies that a multidimensional DCT may be implemented by a series of one-dimensional transforms. Accordingly, faster algorithms may be developed for one-dimensional DCTs and be directly extended to multidimensional transforms.

In a DCT, a block of pixels is transformed into a same-size block of coefficients in the frequency domain. Essentially, the transform expresses a block of pixels as a linear combination of orthogonal basis images. The magnitudes of the coefficients express the extent to which the block of pixels and the basis images are similar.

Generally, an image to be processed in the digital domain is composed of pixel data divided into an array of non-overlapping blocks, N×N in size. A two-dimensional DCT may be performed on each block. The two-dimensional DCT is defined by the following relationship:

$$X(k, l) = \frac{\alpha(k)\beta(l)}{N} \sum_{m=0}^{N-1} \sum_{n=0}^{N-1} x(m, n) \cos\left[\frac{(2m+1)\pi k}{2N}\right] \cos\left[\frac{(2m+1)\pi l}{2N}\right],$$

$$0 \le k, l \le N - 1$$

where $$\alpha(k), \beta(k) = \begin{cases} 1, & \text{if } k = 0 \\ \sqrt{2}, & \text{if } k \ne 0 \end{cases},$$

and x(m,n) is the pixel location (m,n) within an N×M block, and

X(k,l) is the corresponding DCT coefficient.

Since pixel values are non-negative, the DCT component X(0,0) is always positive and usually has the most energy. In fact, for typical images, most of the transform energy is concentrated around the component X(0,0). This energy compaction property makes the DCT technique such an attractive compression method.

It has been observed that most natural images are made up of flat relatively slow varying areas, and busy areas such as object boundaries and high-contrast texture. Contrast adaptive coding schemes take advantage of this factor by assigning more bits to the busy areas and fewer bits to the less busy areas. This technique is disclosed in U.S. Pat. No. 5,021,891, entitled "Adaptive Block Size Image Compression Method and System," assigned to the assignee of the present invention and incorporated herein by reference. DCT techniques are also disclosed in U.S. Pat. No. 5,107,345, entitled "Adaptive Block Size Image Compression Method And System," assigned to the assignee of the present invention and incorporated herein by reference. Further, the use of the ABSDCT technique in combination with a Differential Quadtree Transform technique is discussed in U.S. Pat. No. 5,452,104, entitled "Adaptive Block Size Image Compression Method And System," also assigned to the assignee of the present invention and incorporated herein by reference. The systems disclosed in these patents utilizes what is referred to as "intra-frame" encoding, where each frame of image data is encoded without regard to the content of any other frame. Using the ABSDCT technique, the achievable data rate may be greatly reduced without discernible degradation of the image quality.

Using ABSDCT, a video signal will generally be segmented into frames and blocks of pixels for processing. The DCT operator is one method of converting a time-sampled signal to a frequency representation of the same signal. By converting to a frequency representation, DCT techniques have been shown to allow for very high levels of compression, as quantizers can be designed to take advantage of the frequency distribution characteristics of an image. In a preferred embodiment, one 16×16 DCT is applied to a first ordering, four 8×8 DCTs are applied to a second ordering, 16 4×4 DCTs are applied to a third ordering, and 64 2×2 DCTs are applied to a fourth ordering.

For image processing purposes, the DCT operation is performed on pixel data that is divided into an array of non-overlapping blocks. Note that although block sizes are discussed herein as being N×N in size, it is envisioned that various block sizes may be used. For example, an N×M block size may be utilized where both N and M are integers with M being either greater than or less than N. Another important aspect is that the block is divisible into at least one level of sub-blocks, such as N/i×N/i, N/i×N/j, N/i×M/j, and etc. where i and j are integers. Furthermore, the exemplary block size as discussed herein is a 16×16 pixel block with corresponding block and sub-blocks of DCT coefficients. It is further envisioned that various other integers such as both even or odd integer values may be used, e.g., 9×9.

A color signal may be converted from RGB space to $YC_1C_2$ space, with Y being the luminance, or brightness, component, and $C_1$ and $C_2$ being the chrominance, or color, components. Because of the low spatial sensitivity of the eye to color, many systems sub-sample the $C_1$ and $C_2$ components by a factor of four in the horizontal and vertical directions. However, the sub-sampling is not necessary. A full resolution image, known as 4:4:4 format, may be either very useful or necessary in some applications such as those referred to as covering digital cinema. Two possible $YC_1C_2$ representations are, the YIQ representation and the YUV representation, both of which are well known in the art. It is also possible to employ a variation of the YUV representation known as YCbCr.

Figure 1B:
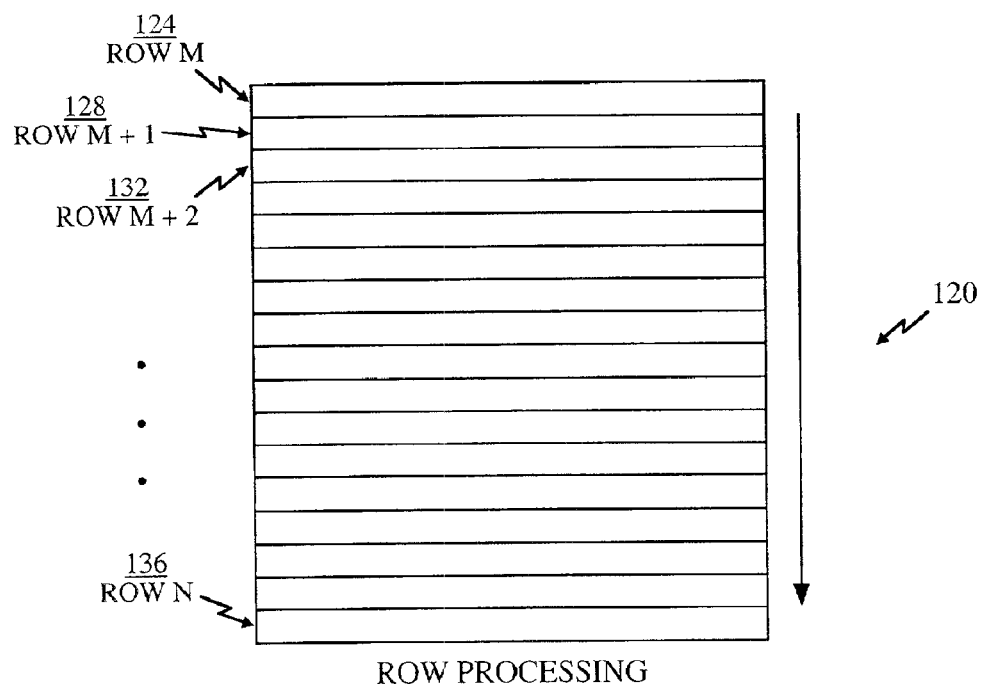

FIGS. 1a and 1b illustrate column and row processing of a N×N block of encoded data 100 and 120. An N dimensional transform may be performed as a cascade of N one-dimensional transforms. For example, a 2×2 DCT is performed as a cascade of two one-dimensional DCT processes, first operating on each column and then operating on each row. A first column m (104) is processed, followed by column m+1 (108), followed by column m+2 (112), and so on through column n (116). After the columns are processed, the rows 120 are processed as illustrated in FIG 1b. First, row m (124) is processed, followed by row m+1 (128), row m+2 (132) and so on through row n (136).

Similarly, another example may be an 8×8 block of data needing IDCT processing. The 8×8 block may be broken into four two-dimensional IDCTs. Each two-dimensional IDCT may then be processed in the same manner with respect to the two-dimensional DCT described with respect to FIGS. 1a and 1b.

Figure 2A:
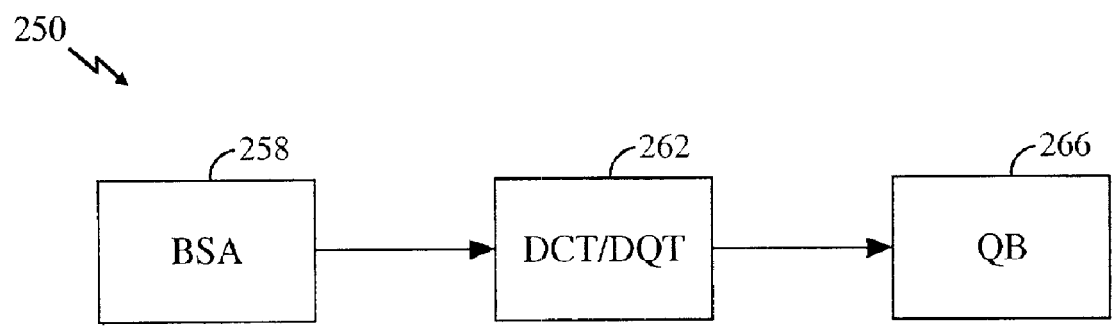
FIG. 2a is a block diagram illustrating the flow of data through an encoding process.
Figure 2B:
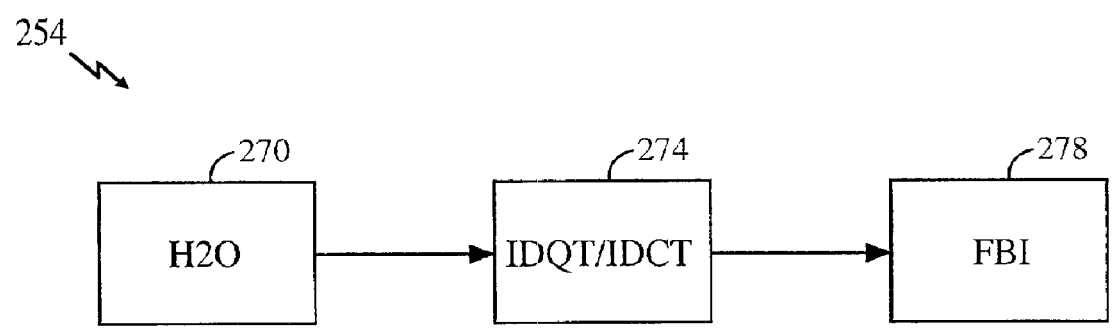
FIG. 2b is a flow diagram illustrating the flow of data through a decoding process.

FIG. 2a illustrates a block diagram 250 of the flow of encoded data during an encoding process. In the encoding process, encoded data is transformed from the pixel domain to the frequency domain. FIG. 2b illustrates a block diagram 254 of the flow of encoded data through a decoding process. In the decoding process, encoded data is transformed from the frequency domain to the pixel domain. As illustrated in the encode process 250, a block sized assignment (BSA) of the encoded data is first performed (258). In an aspect of an embodiment, each of the Y, Cb, and Cr components is processed without sub-sampling. Thus, an input of a 16×16 block of pixels is provided to the block size assignment element 258, which performs block size assignment in preparation for video compression.

The block size assignment element 258 determines the block decomposition of a block based on the perceptual characteristics of the image in the block. Block size assignment subdivides each 16×16 block into smaller blocks in a quad-tree fashion depending on the activity within a 16×16 block. The block size assignment element 258 generates a quad-tree data, called the PQR data, whose length can be between 1 and 21 bits. Thus, if block size assignment determines that a 16×16 block is to be divided, the R bit of the PQR data is set and is followed by four additional bits of Q data corresponding to the four divided 8×8 blocks. If block size assignment determines that any of the 8×8 blocks is to be subdivided, then four additional bits of P data for each 8×8 block subdivided are added.

Data is divided into block sizes, such as 2×2, 4×4, 8×8, and 16×16. An encode data processor then performs a transform (DCT/DQT) of the encoded data (262), as is described with respect to FIG. 3. After the DCT/DQT process 262 is completed, a quantization process (QB) 266 is performed on the encoded data. This completes transformation of encoded data from the pixel domain to the frequency domain.

In an embodiment, the DCT coefficients are quantized using frequency weighting masks (FWMs) and a quantization scale factor. A FWM is a table of frequency weights of the same dimensions as the block of input DCT coefficients. The frequency weights apply different weights to the different DCT coefficients. The weights are designed to emphasize the input samples having frequency content that the human visual system is more sensitive to, and to de-emphasize samples having frequency content that the visual system is less sensitive to. The weights may also be designed based on factors such as viewing distances, etc.

Huffman codes are designed from either the measured or theoretical statistics of an image. It has been observed that most natural images are made up of blank or relatively slowly varying areas, and busy areas such as object boundaries and high-contrast texture. Huffman coders with frequency-domain transforms such as the DCT exploit these features by assigning more bits to the busy areas and fewer bits to the blank areas. In general, Huffman coders make use of look-up tables to code the run-length and the non-zero values.

The weights are selected based on empirical data. A method for designing the weighting masks for 8×8 DCT coefficients is disclosed in ISO/IEC JTC1 CD 10918, "Digital compression and encoding of continuous-tone still images—part 1: Requirements and guidelines," International Standards Organization, 1994, which is herein incorporated by reference. In general, two FWMs are designed, one for the luminance component and one for the chrominance components. The FWM tables for block sizes 2×2, 4×4 are obtained by decimation and 16×16 by interpolation of that for the 8×8 block. The scale factor controls the quality and bit rate of the quantized coefficients.

Thus, each DCT coefficient is quantized according to the relationship:

$$DCT_q(i, j) = \left\lfloor \frac{8 * DCT(i, j)}{fwm(i, j) * q} \pm \frac{1}{2} \right\rfloor$$

where DCT(i,j) is the input DCT coefficient, fwm(i,j) is the frequency weighting mask, q is the scale factor, and DCTq (i,j) is the quantized coefficient. Note that depending on the sign of the DCT coefficient, the first term inside the braces is rounded up or down. The DQT coefficients are also quantized using a suitable weighting mask. However, multiple tables or masks can be used, and applied to each of the Y, Cb, and Cr components.

The quantized coefficients are provided to a zigzag scan serializer 268. The serializer 268 scans the blocks of quantized coefficients in a zigzag fashion to produce a serialized stream of quantized coefficients. A number of different zigzag scanning patterns, as well as patterns other than zigzag may also be chosen. A preferred technique employs 8×8 block sizes for the zigzag scanning, although other sizes, such as 4×4 or 16×16, may be employed.

Note that the zigzag scan serializer 268 may be placed either before or after the quantizer 266. The net results are the same.

In any case, the stream of quantized coefficients is provided to a variable length coder 269. The variable length coder 269 may make use of run-length encoding of zeros followed by encoding. This technique is discussed in detail in aforementioned U.S. Pat. Nos. 5,021,891, 5,107,345 and 5,452,104, and in pending U.S. patent application Ser. No. <000163>, which is incorporated by reference and is summarized herein. A run-length coder takes the quantized coefficients and notes the run of successive coefficients from the non-successive coefficients. The successive values are referred to as run-length values, and are encoded. The non-successive values are separately encoded. In an embodiment, the successive coefficients are zero values, and the non-successive coefficients are non-zero values. Typically, the run length is from 0 to 63 bits, and the size is an AC value from 1–10. An end of file code adds an additional code—thus, there is a total of 641 possible codes.

In the decoding process, encoded data in the frequency domain is converted back into the pixel domain. A variable length decoder 270 produces a run-length and size of the data and provides the data to an inverse zigzag scan serializer 271 that orders the coefficients according to the scan scheme employed. The inverse zigzag scan serializer 271 receives the PQR data to assist in proper ordering of the coefficients into a composite coefficient block. The composite block is provided to an inverse quantizer 272, for undoing the processing due to the use of the frequency weighting masks.

A finger printer (H2O) 273 is then performed on the encoded data. The finger printer places a watermark or other identifier information on the data. The watermark may be recovered at a later time, to reveal identifier information. Identifier information may include information such as where and when material was played, and who was authorized to play such material. Following the finger printer 273, a decoder data process 274 (IDQT/IDCT) is commenced, which is described in detail with respect to FIG. 4. After the data is decoded, the data is sent to the Frame Buffer Interface (FBI) 278. The FBI is configured to read and write uncompressed data a frame at a time. In an embodiment, the FBI has a capacity of four frames, although it is contemplated that the storage capacity may be varied.

Figure 2C:
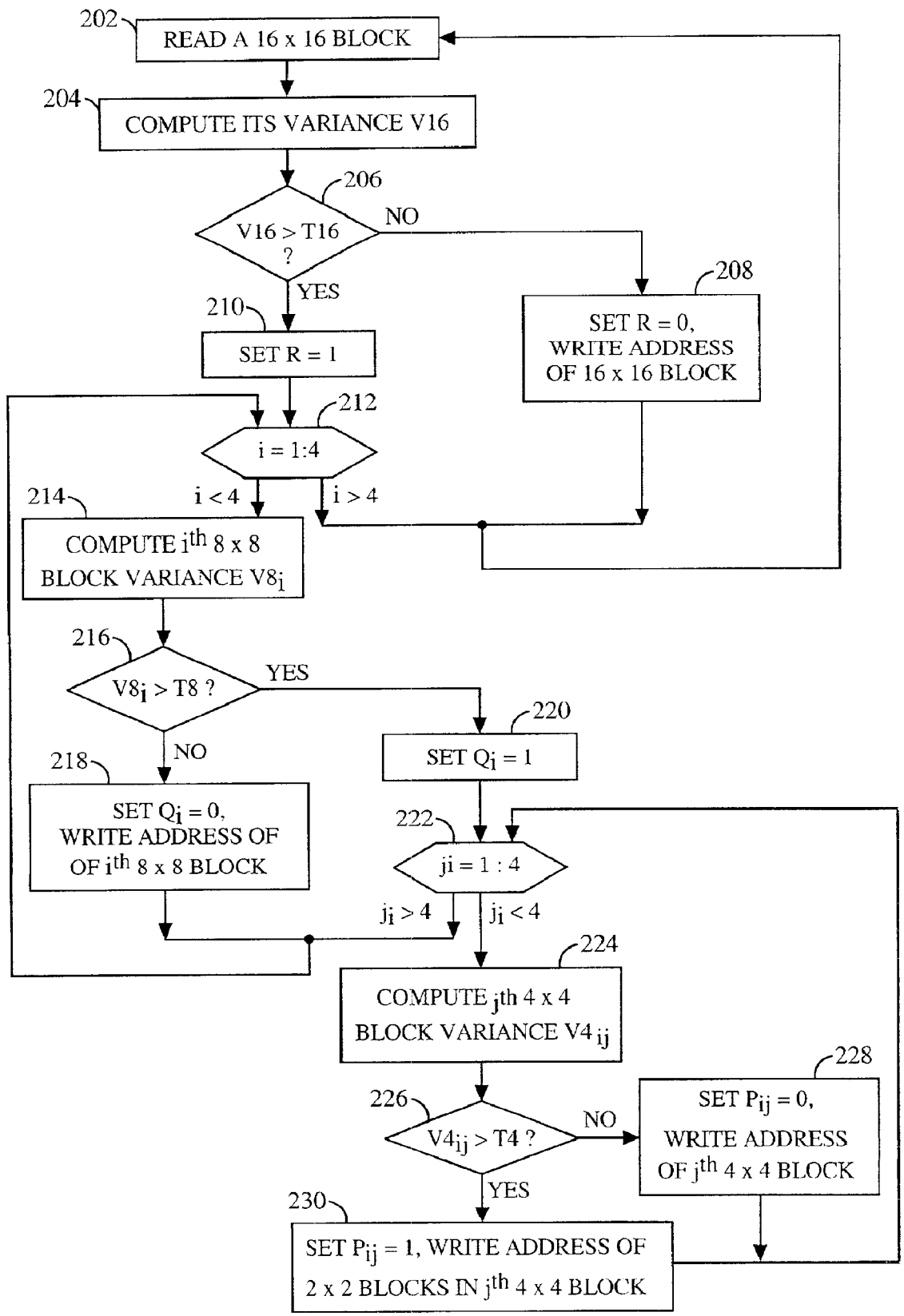
FIG. 2c is a block diagram illustrating the processing steps involved in variance based block size assignment.

Referring now to FIG. 2c, a flow diagram showing details of the operation of the block size assignment element 258 is provided. The algorithm uses the variance of a block as a metric in the decision to subdivide a block. Beginning at step 202, a 16×16 block of pixels is read. At step 204, the variance, v16, of the 16×16 block is computed. The variance is computed as follows:

$$\text{var} = \frac{1}{N^2} \sum_{i=0}^{N-1} \sum_{j=0}^{N-1} x_{i,j}^2 - \left( \frac{1}{N^2} \sum_{i=0}^{N-1} \sum_{j=0}^{N-1} x_{i,j} \right)^2$$

where N=16, and $x_{i,j}$ is the pixel in the $i^{th}$ row, $j^{th}$ column within the N×N block. At step 206, first the variance threshold T16 is modified to provide a new threshold T'16 if the mean value of the block is between two predetermined values, then the block variance is compared against the new threshold, T'16.

If the variance v16 is not greater than the threshold T16, then at step 208, the starting address of the 16×16 block is written, and the R bit of the PQR data is set to 0 to indicate that the 16×16 block is not subdivided. The algorithm then reads the next 16×16 block of pixels. If the variance v16 is greater than the threshold T16, then at step 210, the R bit of the PQR data is set to 1 to indicate that the 16×16 block is to be subdivided into four 8×8 blocks.

The four 8×8 blocks, i=1:4, are considered sequentially for further subdivision, as shown in step 212. For each 8×8 block, the variance, $v8_i$, is computed, at step 214. At step 216, first the variance threshold T8 is modified to provide a new threshold T'8 if the mean value of the block is between two predetermined values, then the block variance is compared to this new threshold.

If the variance $v8_i$ is not greater than the threshold T8, then at step 218, the starting address of the 8×8 block is written, and the corresponding Q bit, $Q_i$, is set to 0. The next 8×8 block is then processed. If the variance $v8_j$ is greater than the threshold T8, then at step 220, the corresponding Q bit, $Q_i$, is set to 1 to indicate that the 8×8 block is to be subdivided into four 4×4 blocks.

The four 4×4 blocks, $j_i$=1:4, are considered sequentially for further subdivision, as shown in step 222. For each 4×4 block, the variance, $v4_{ij}$, is computed, at step 224. At step 226, first the variance threshold T4 is modified to provide a new threshold T'4 if the mean value of the block is between two predetermined values, then the block variance is compared to this new threshold.

If the variance $v4_{ij}$ is not greater than the threshold T4, then at step 228, the address of the 4×4 block is written, and the corresponding P bit, $P_{ij}$, is set to 0. The next 4×4 block is then processed. If the variance $v4_{ij}$ is greater than the threshold T4, then at step 230, the corresponding P bit, $P_{ij}$, is set to 1 to indicate that the 4×4 block is to be subdivided into four 2×2 blocks. In addition, the address of the 4 2×2 blocks is written.

The thresholds T16, T8, and T4 may be predetermined constants. This is known as the hard decision. Alternatively, an adaptive or soft decision may be implemented. The soft decision varies the thresholds for the variances depending on the mean pixel value of the 2N×2N blocks, where N can be 8, 4, or 2. Thus, functions of the mean pixel values, may be used as the thresholds.

Figure 11A:
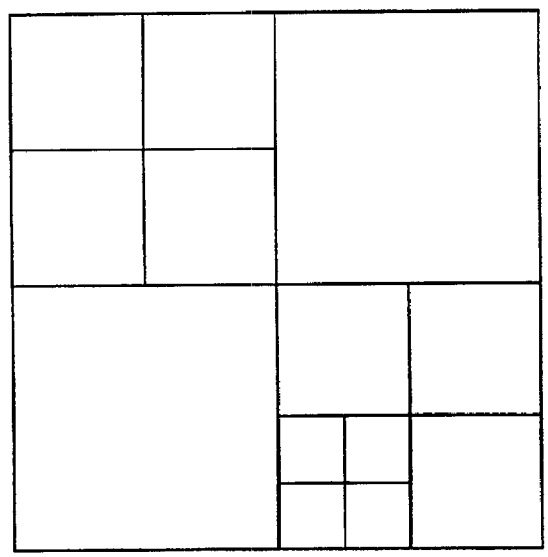
FIG. 11a illustrates an exemplary block size assignment.
Figure 11B:
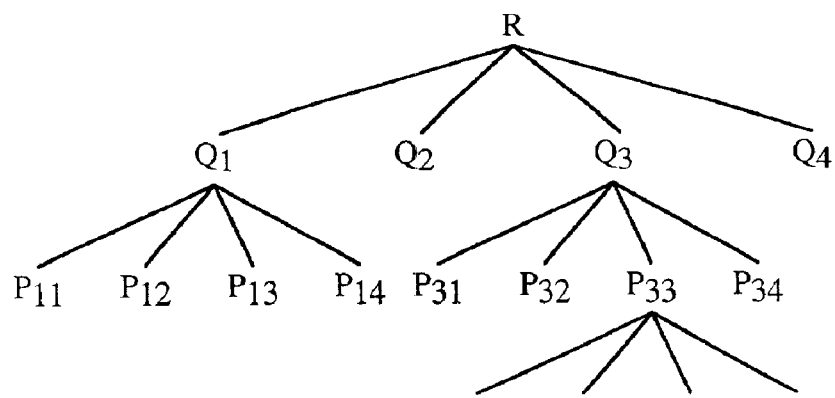
Figure 11C:
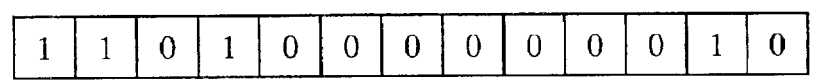

For purposes of illustration, consider the following example. Let the predetermined variance thresholds for the Y component be 50, 1100, and 880 for the 16×16, 8×8, and 4×4 blocks, respectively. In other words, T16=50, T8=1100, and T16=880. Let the range of mean values be 80 and 100. Suppose the computed variance for the 16×16 block is 60. Since 60 and its mean value 90 are greater than T16, the 16×16 block is subdivided into four 8×8 sub-blocks. Suppose the computed variances for the 8×8 blocks are 1180, 935, 980, and 1210. Since two of the 8×8 blocks have variances that exceed T8, these two blocks are further subdivided to produce a total of eight 4×4 sub-blocks. Finally, suppose the variances of the eight 4×4 blocks are 620, 630, 670, 610, 590, 525, 930, and 690, with the first four corresponding means values 90, 120, 110, 115. Since the mean value of the first 4×4 block falls in the range (80, 100), its threshold will be lowered to T'4=200 which is less than 880. So, this 4×4 block will be subdivided as well as the seventh 4×4 block. The resulting block size assignment is illustrated in FIG. 11a. The corresponding quad-tree decomposition is illustrated in FIG. 11b. The PQR data generated by this block size assignment is illustrated in FIG. 11c.

Note that a similar procedure is used to assign block sizes for the color components $C_1$ and $C_2$. The color components may be decimated horizontally, vertically, or both. Additionally, note that although block size assignment has been described as a top down approach, in which the largest block (16×16 in the present example) is evaluated first, a bottom up approach may instead be used. The bottom up approach will evaluate the smallest blocks (2×2 in the present example) first.

The PQR data, along with the addresses of the selected blocks, are provided to a DCT/DQT element 262. The DCT/DQT element 262 uses the PQR data to perform discrete cosine transforms of the appropriate sizes on the selected blocks. Only the selected blocks need to undergo DCT processing. The DQT is also used for reducing the redundancy among the DC coefficients of the DCTs. A DC coefficient is encountered at the top left corner of each DCT block. The DC coefficients are, in general, large compared to the AC coefficients. The discrepancy in sizes makes it difficult to design an efficient variable length coder. Accordingly, it is advantageous to reduce the redundancy among the DC coefficients. The DQT element performs 2-D DCTs on the DC coefficients, taken 2×2 at a time. Starting with 2×2 blocks within 4×4 blocks, a 2-D DCT is performed on the four DC coefficients. This 2×2 DCT is called the differential quad-tree transform, or DQT, of the four DC coefficients. Next, the DC coefficient of the DQT along with the three neighboring DC coefficients with an 8×8 block are used to compute the next level DQT. Finally, the DC coefficients of the four 8×8 blocks within a 16×16 block are used to compute the DQT. Thus, in a 16×16 block, there is one true DC coefficient and the rest are AC coefficients corresponding to the DCT and DQT.

Within a frame, each 16×16 block is computed independently. Accordingly, the processing algorithm used for a given block may be changed as necessary, as determined by the PQR.

Figure 3:
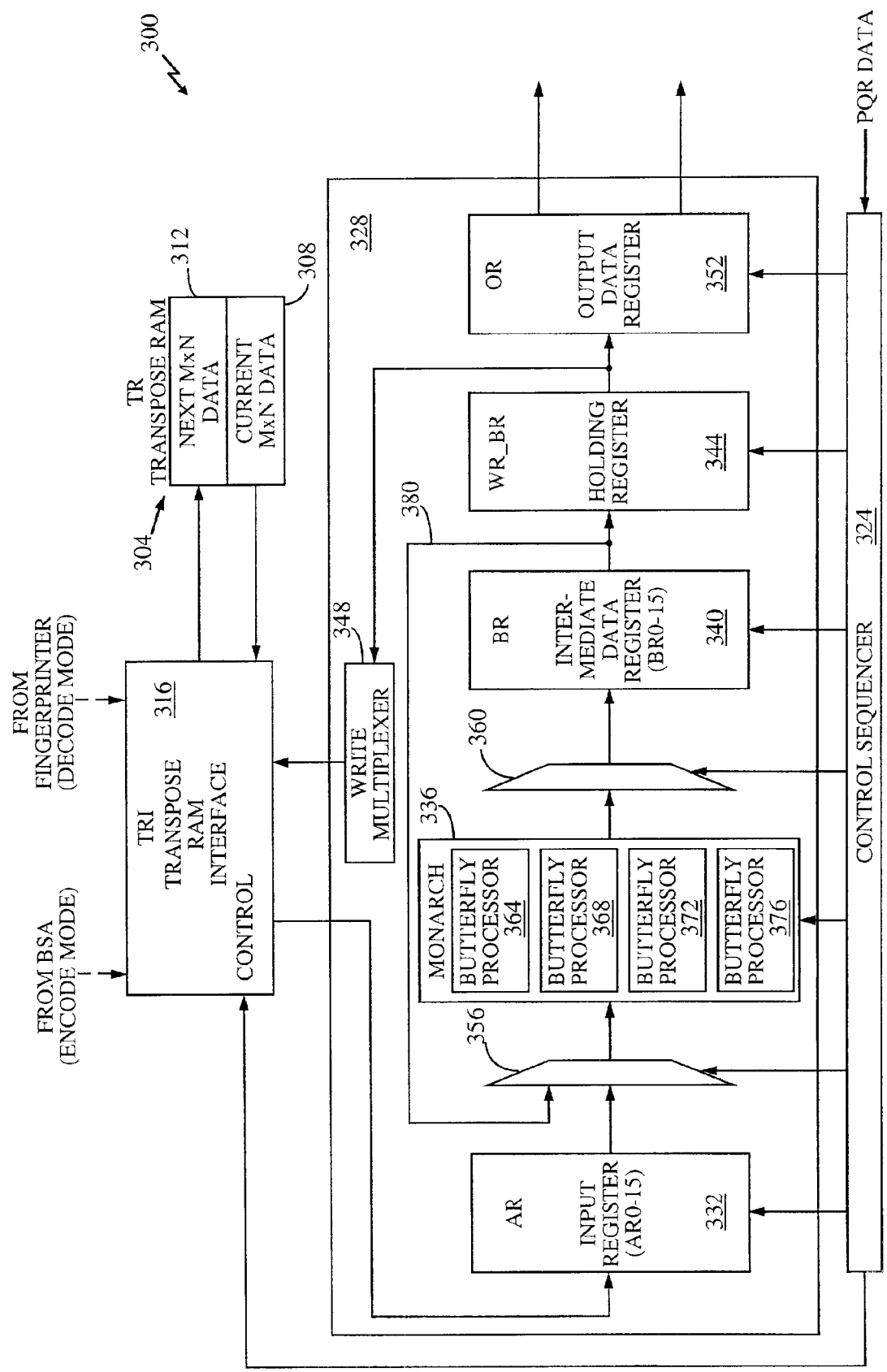
FIG. 3 is a block diagram illustrating an apparatus to compute a transform, such as a discrete cosine transform (DCT) and a discrete quantization transform (DQT), embodying the invention.

FIG. 3 is a block diagram illustrating computation of the DCT/DQT and the IDQT/IDCT of a block of encoded data 300. In encode mode, as illustrated in FIG. 3, the encoded data is initially in the pixel domain. As the encoded data is processed through intermediate steps, the encoded data is transformed into the frequency domain. In decode mode, the encoded data is initially in the frequency domain. As the encoded data is processed through intermediate steps, the encoded data is transformed into the pixel domain.

Referring to FIG. 3, at least one M×N block of encoded data is stored in a transpose RAM 304. The transpose RAM 304 may contain one or more blocks of M×N data. In an embodiment with two blocks of encoded data, one is configured to contain a current M×N block of data 308, and the other configure to contain a next block of M×N data 312.

The blocks of data 308 and 312 are transferred to transpose RAM 304 from the block size assignment 208 as illustrated in FIG. 2a (in encode mode) or the fingerprinter 220 as illustrated in FIG. 2b (in decode mode). In an embodiment, the transpose RAM 304 may be a dual port RAM, such that a transpose RAM interface 316 processes the current block of data 308 and receives the next block of data from the fingerprinter 220. The transpose RAM interface 316 controls timing and may have buffered memory to allow blocks of data to be read from and written to the transpose RAM 304. In an embodiment, the transpose RAM 304 and transpose RAM interface 316 may be responsive to one or more control signals from a control sequencer 324.

Encoded data enters a data processor 328 from transpose RAM 304 (or through the transpose RAM interface 316) into one or more input registers 332. In an embodiment, there are 16 input registers 332. In an embodiment, the data processor 328 first processes column data, followed by row data, as illustrated in FIG. 1. The data processor 328 may alternatively process the rows followed by the columns, however, the following description assumes that column data is processed prior to row data. The input register 332 comprises of a single column encoded data of the 16×16 block. The data processor 328 computes the transform by performing mathematical operations on the encoded data, column by column, and writes the data back into the transpose RAM 304. After the columns of data are processed, the data processor 328 processes each row of encoded data. After each row of encoded data is processed, the data processor 328 outputs the data through an output register 352.

In an embodiment, the block of data is a 16×16 block of encoded data, although it is contemplated that any size block of data may be used, such as 32×32, 8×8, 4×4, or 2×2, or combinations thereof. Accordingly, as the data processor 328 is processing a block of data from the transpose RAM 304 (for example, the current M×N block of data 308), the transpose RAM interface 316 receives the next block of data 312 from the BSA 208 (encode mode) or the fingerprinter 220 (decode mode). When the data processor 328 has completed processing of the current block of data 308, the transpose RAM interface 316 reads the next block of data 312 from the transpose RAM 304 interface and loads it into data processor 328. As such, data from the transpose RAM 304 toggles between the current block of data 308 and the next block of data 312 as dictated by the transpose RAM interface 316 and the control sequencer 324.

The data processor 328 comprises input register 332, at least one butterfly processor within a monarch butterfly cluster 336 and at least one intermediate data register 340. Data processor 328 may also comprise a holding register 344, a write mutliplexer 348, and output data register 352. Monarch butterfly cluster 336 may further comprise a first input multiplexer 356, and intermediate data register 340 further comprises a second input multiplexer 360. The aforementioned components of data processor 328 are preferably controlled by the control sequencer 324.

In operation, for a given column or row of data, the input register 332 is configured to receive the encoded data through the transpose RAM interface 316 from the transpose RAM 304. The control sequencer 324 enables certain addresses of the input register to send the data through input multiplexer 356. The data input is resequenced as by selection through input multiplexer 356 such that the proper pairs of encoded data are selected for mathematical operations. Controlled by the control sequencer 324, the input multiplexer 356 passes the data to the monarch butterfly cluster 336. The monarch butterfly cluster 336 comprises one or more butterfly processors. In an embodiment, the monarch butterfly cluster 336 comprises four individual butterfly processors 364, 368, 372, and 376, and control sequencer 324 routes encoded data through input multiplexer 356 to the appropriate butterfly processor.

Each individual butterfly processor 364, 368, 372 or 376 is capable of performing one-dimensional transforms, such as the DCT, IDCT, DQT and IDQT. A one-dimensional transform typically involve arithmetic operations, such as simple adders, subtractors, or a multiplier. After a portion of a one-dimensional transform is performed on a pair of data elements, the resulting output is transferred to the intermediate data register 340. Intermediate data register 340 may be responsive to the control sequencer 324. The control sequencer may be a device such as a state machine, a microcontroller, or a programmable processor. In an embodiment in which the intermediate data register 340 is responsive to the control sequencer 324, selected data elements stored in the intermediate data register 340 are fed back to appropriate butterfly processor using a feedback path 380 and through first input multiplexer 356, to be processed again (i.e., another portion of a one-dimensional transform). This feedback loop continues until all one-dimensional processing for the encoded data is completed. When the processing of the data is completed, the data from the intermediate data register 340 is written to the WRBR holding register 344. If the data being processed is column data, the data is written from the WRBR holding register 344 through the write multiplexer 348 and stored back into the transpose RAM 304, so that row processing may begin. The write multiplexer 348 is controlled to resequence the processed column data back into its original sequence. If the holding register data is row data (and thus, all of the column processing is complete), the data is routed to the output register 352. The control sequencer 324 may then control output of data from the daisy chain multiplexer and output data register 352.

Figure 4:
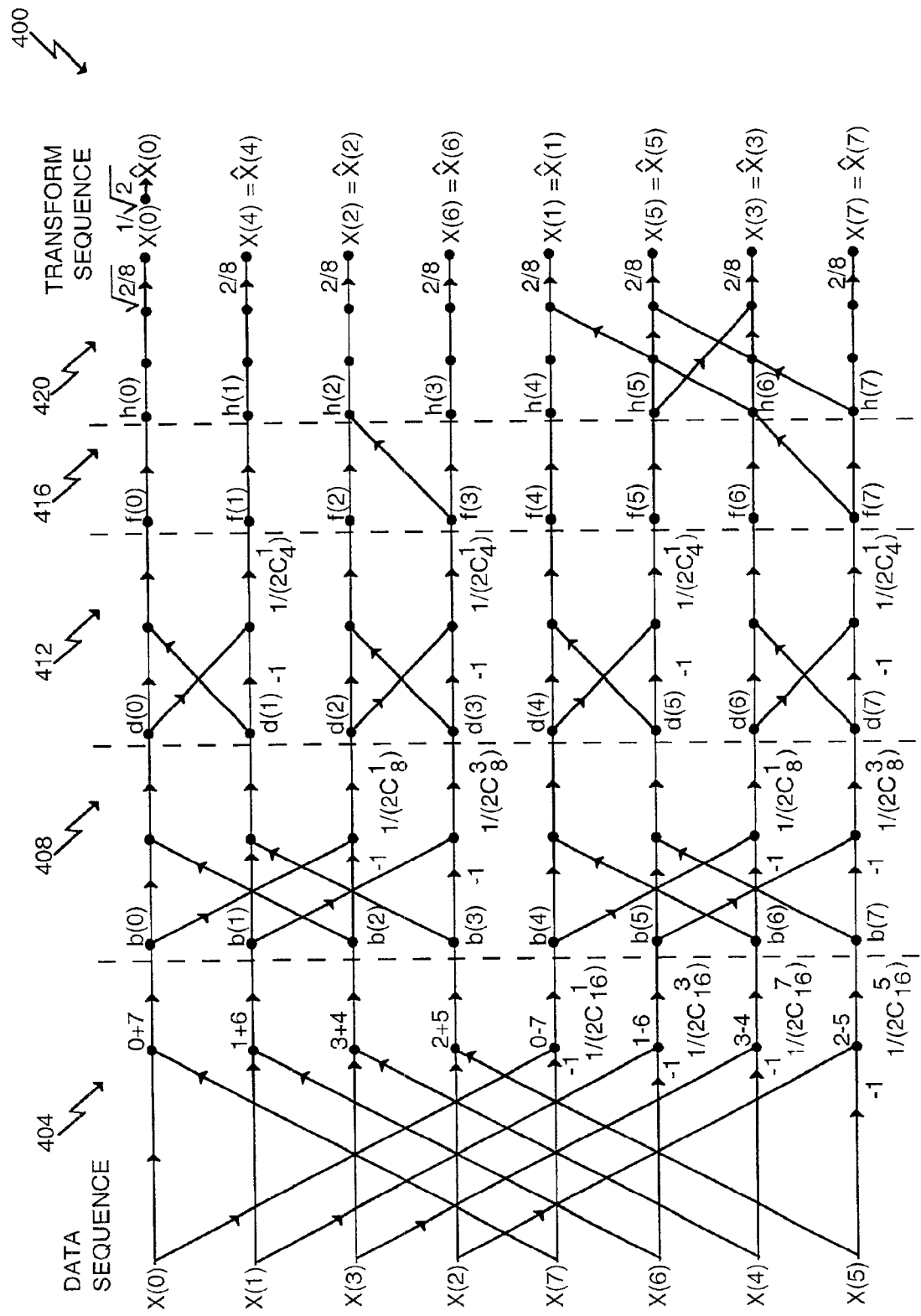
FIG. 4 illustrates a DCT trellis that is implemented by the apparatus of FIG. 3.
Figure 5:
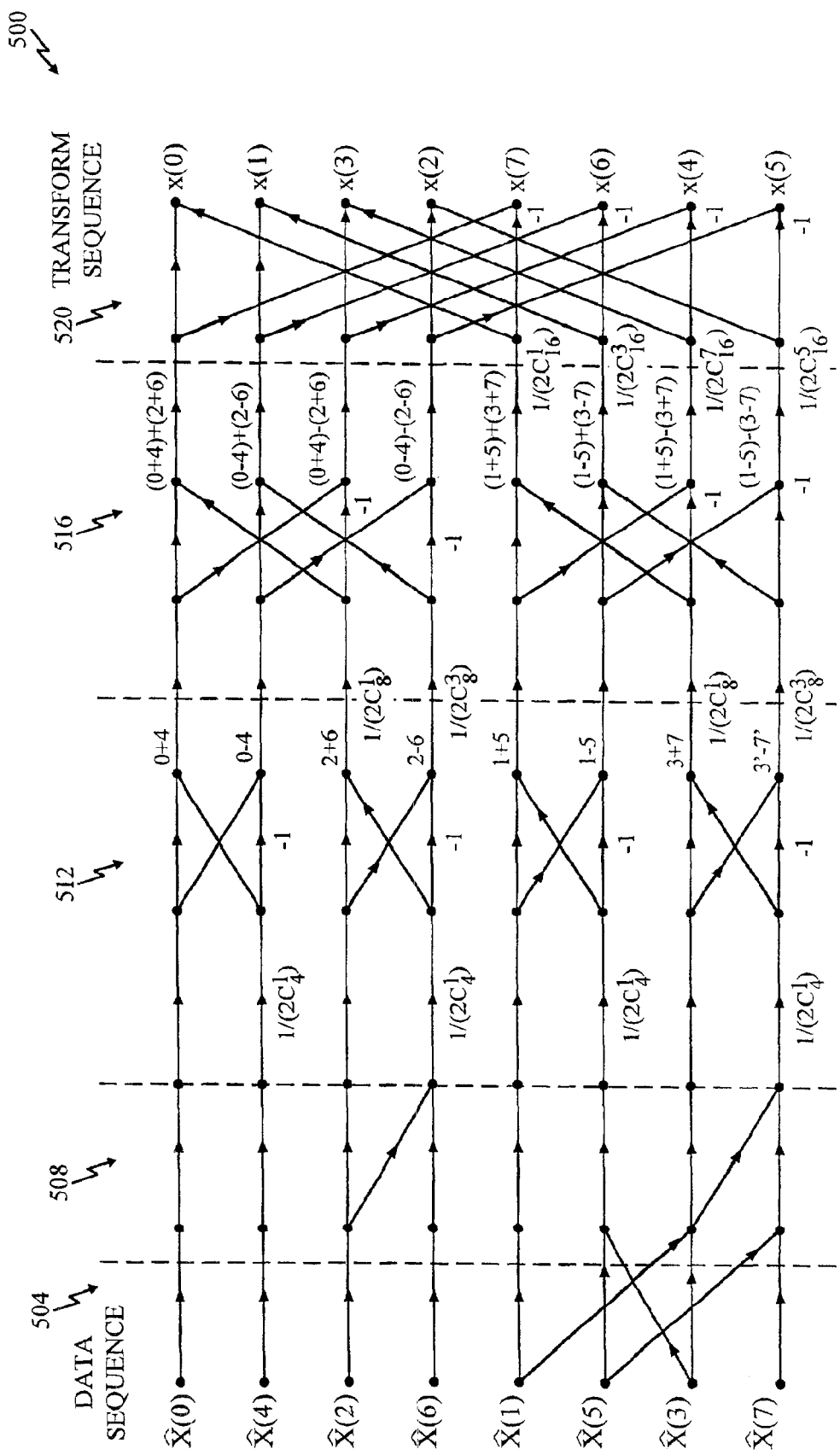
FIG. 5 illustrates an IDCT trellis that is implemented by the apparatus of FIG. 3.

FIG. 4 illustrates a DCT trellis that may be implemented in encode mode by the data path processor 328 of FIG. 3. Similarly, FIG. 5 illustrates an IDCT trellis that may be implemented in decode mode by the data path processor 328 of FIG. 3. As dictated by the PQR data and/or depending on the type of computation being performed, the control sequencer 324 may select different pairs of elements of encoded data to combine and performs portions of a one-dimensional transform. For example, in the trellis of FIG. 4, eight operations occur in column 404. The operations illustrated are as follows: x(0)+x(7), x(1)+x(6), x(3)+x(4), x(2)+x(5), x(0)−x(7), x(1)−x(6), x(3)−x(4) and x(2)−x(5). Each of the butterfly processors 364, 368, 372 and 376 (as shown FIG. 3) handles one of the four operations in a given clock cycle. Thus, for example, butterfly processor 364 computes the operation of x(0)+x(7) and x(0)−x(7), butterfly processor 368 computes the operation of x(1)+x(6) and x(1)−x(6), butterfly processor 372 computes the operation of x(3)+x(4) and x(3)−x(4), and butterfly processor 376 computes the operation of x(2)+x(5) and x(2)−x(5), all in the same clock cycle. The results of each of these operations may be temporarily stored in a pipeline register or in the intermediate data register 340, and then routed to the input multiplexer 360. Operation of the pipeline register is described in the specification with respect to FIG. 9c and 9d.

Optionally, in the next clock cycle, the remaining four multiplication operations are computed using the same four butterfly processors. Accordingly, butterfly processor 364 computes $[x(0)-x(7)]*(\frac{1}{2}C^1_{16})$, butterfly processor 368 computes $[x(1)-x(6)]*$ $(\frac{1}{2}C^3_{16})$, butterfly processor 372 computes $[x(3)-x(4)]*(\frac{1}{2}C^7_{16})$ and butterfly processor 376 computes $[x(2)-x(5)]*(\frac{1}{2}C^5_{16})$. The results of these computations are temporarily stored in the intermediate data register 340. As computations are completed, the encoded data is not in the same sequence that the encoded data was in when originally input. Accordingly, control sequencer 324 and input multiplexer 356 resequences encoded data, or partially processed encoded data after each feed back loop, as necessary.

In the following clock cycle, computations are processed for column 408, the results of which are again stored in the intermediate data register 340 are fed back through input multiplexer 360. Again, the fed back encoded data, now partially processed, is resequenced such that the right portions of encoded data are routed to the appropriate butterfly processor. Accordingly, butterfly processor 364 processes b(0)+b(2) and b(0)−b(2). Similarly, butterfly processor 368 computes b(1)+b(3) and b(1)−b(3), butterfly processor 372 computes b(4)+b(6) and b(4)−b(6)and butterfly processor 376 computes b(5)+b(7) and b(5)−b(7). The resulting computations are again stored with the intermediate data register 340 or a pipeline register, and routed through the input multiplexer 360. In the next clock cycle, multiplications are performed by $\frac{1}{2}\ C^1_8$, $\frac{1}{2}C^3_8$, $\frac{1}{2}C^1_8$, and $\frac{1}{2}C^3_8$, in the same manner as described with respect to column 404. Thus, butterfly processor 364 computes b(0)−b(2)*$\frac{1}{2}\ C^1_8$, butterfly processor 368 computes b(1)−b(3)*$\frac{1}{2}\ C^3_8$, butterfly processor 372 computes b(4)−b(6)*$\frac{1}{2}\ C^1_8$, butterfly processor 376 computes b(5)−b(7)*$\frac{1}{2}\ C^3_8$.

In the next clock cycle, computations are processed for column 412 for values in the d(0) through d(7) positions are computed, the results of which are again stored in the intermediate data register 340 and are fed back into input multiplexer 360. Accordingly, each butterfly processor computes each stage of each input, such that butterfly processor 364 computes the operation of d(0)+d(1) and d(0)−d(1), butterfly processor 368 computes the operation of d(2)+d(3) and d(2)−d(3), butterfly processor 372 computes the operation of d(4)+d(5) and d(4)−d(5), and butterfly processor 376 computes the operation of d(6)+d(7) and d(6)−d(7), all in the same clock cycle. In the following clock cycle, multiplications by $\frac{1}{2}\ C^1_4$ are computed in the same manner as described with respect to columns 404 and 408.

Column 416 illustrates the next set of mathematical operations computed by the butterfly processors in the next clock cycle. As shown in the example of FIG. 4 in column 416, only two operations are needed during this clock cycle: namely, the sum of the f(2) and f(3) components, and the sum of the f(6) and f(7) components. Accordingly, butterfly processor 364 computes f(2)+f(3), and butterfly processor 368 computes f(6)+f(7).

In the following clock cycle, the computations expressed in column 420 are processed. As such, values for h(4), h(5) and h(6) are computed. Accordingly, butterfly processor 364 computes h(4)+h(6), butterfly processor 368 computes h(5)+h(8), and butterfly processor 372 computes h(5)+h(6).

As readily observable, FIG. 5 illustrates an IDCT trellis that operates in a similar manner, but an opposite sequence than the trellis described with respect to FIG. 4. The IDCT trellis is utilized in the decode process, as opposed to the DCT trellis which operates in the encode process. The butterfly processors 364, 368, 372 and 376 operate in the same manner as described with respect to FIG. 4, taking advantage of efficiencies in parallel processing. Both in the encode and decode process, a significant advantage of an embodiment is the reuse of the same hardware for each stage of the trellis. Accordingly, the hardware is used for the computations illustrated in column 504 is the same as the hardware used for computations of columns 508, 512, 516 and 520. Similarly, the hardware used for the computations illustrated in column 404 is the same as the hardware used for computations of columns 408, 412, 416 and 420.

Once the final results representing the end of the trellis in FIG. 4 are computed, the data is transferred from the intermediate data register 340 to the holding register 344. The holding register 344 and output data register 352 are controlled by control sequencer 324. If data is column data, the data is transferred to the write multiplexer 348 and stored back into the transpose RAM 304. Again, the encoded data is resequenced to reflect the original sequence of the encoded data. If the data is row data, all computations are therefore completed, and the data is transferred from the holding register 344 to the output data register 352.

Figure 6:
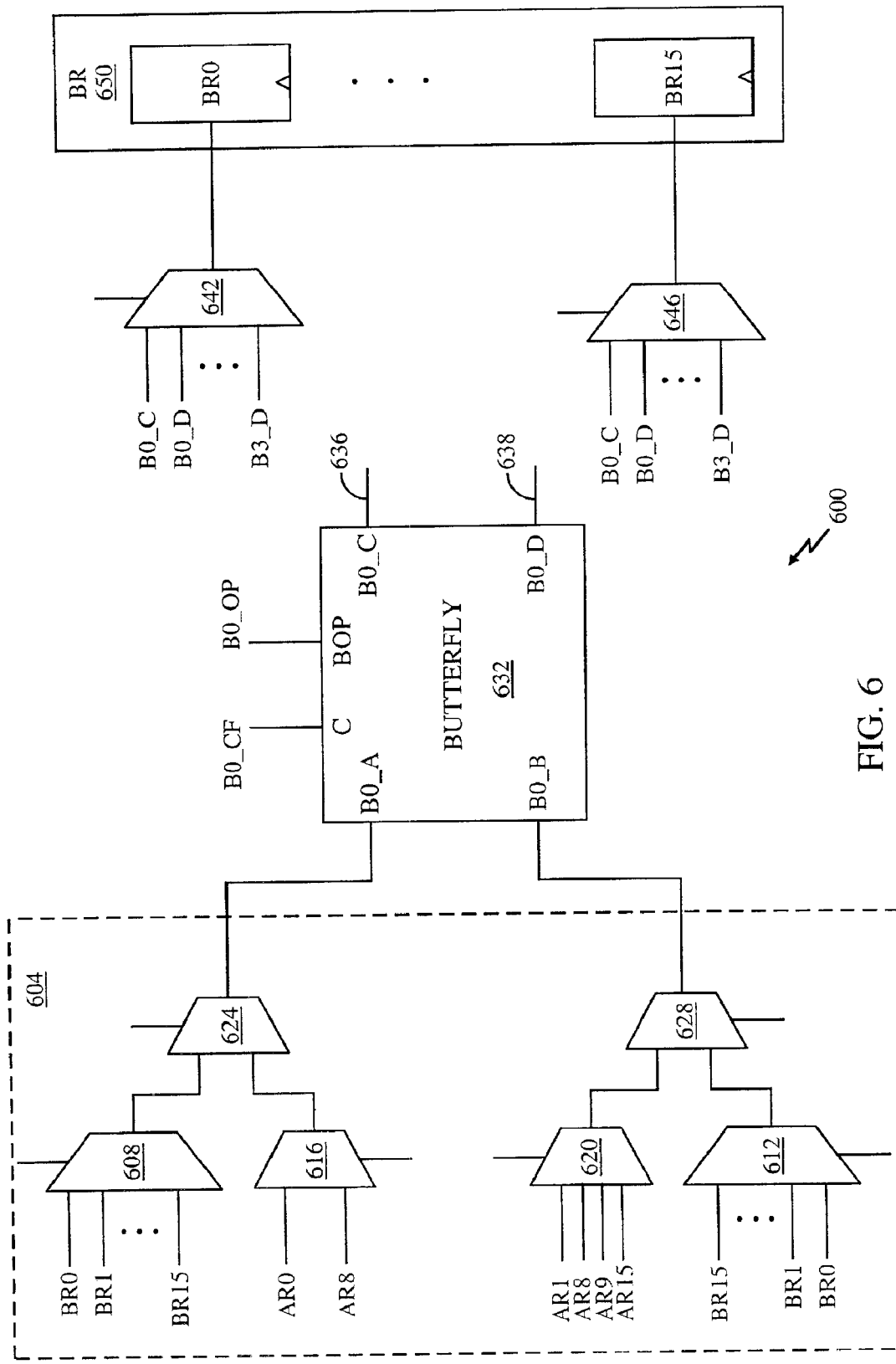
FIG. 6 illustrates a single butterfly processor with input and output multiplexers.

FIG. 6 illustrates an example of a single butterfly processor with one or more input and output multiplexers 600. In an embodiment, data output from one or more intermediate data registers 340 (see FIG. 3) are coupled to an input portal of input multiplexer 604. In an embodiment, the data output from each of the intermediate data registers 340 is input into the butterfly processor to a first multiplexer 608 and a second multiplexer 612. Data output from the input AR register 332 (see FIG. 3) is also transferred through the input multiplexer 604. Specifically, the output of AR register AR(0) and AR(8) are coupled to the input of multiplexer 616, and the outputs of AR(1), AR(8), AR(9) and AR(15) are coupled to the input of multiplexer 620. Multiplexers 624 and 628 select either the signal coming from the AR or the BR register as dictated by the control sequencer 324 (illustrated in FIG. 3). Accordingly, multiplexer 624 selects either the data from multiplexer 608 or 616, and multiplexer 628 selects either the data from multiplexer 620 or multiplexer 612. The outputs of the multiplexers 624 and 628 are thus coupled to the input of the individual butterfly processor 632. Butterfly processor 632 computes a stage of the DCT/IDCT/DQT/IDQT transform, as described with respect to FIGS. 3, 4 and 5. The two outputs of the butterfly processor 632, outputs 636 and 638, are each coupled to the input of each intermediate data multiplexers 642 and 646. Data is then selected from the multiplexers 642 and 646 to a bank of intermediate registers 650. In an embodiment, there are sixteen such intermediate multiplexers and data registers.

Figure 7:
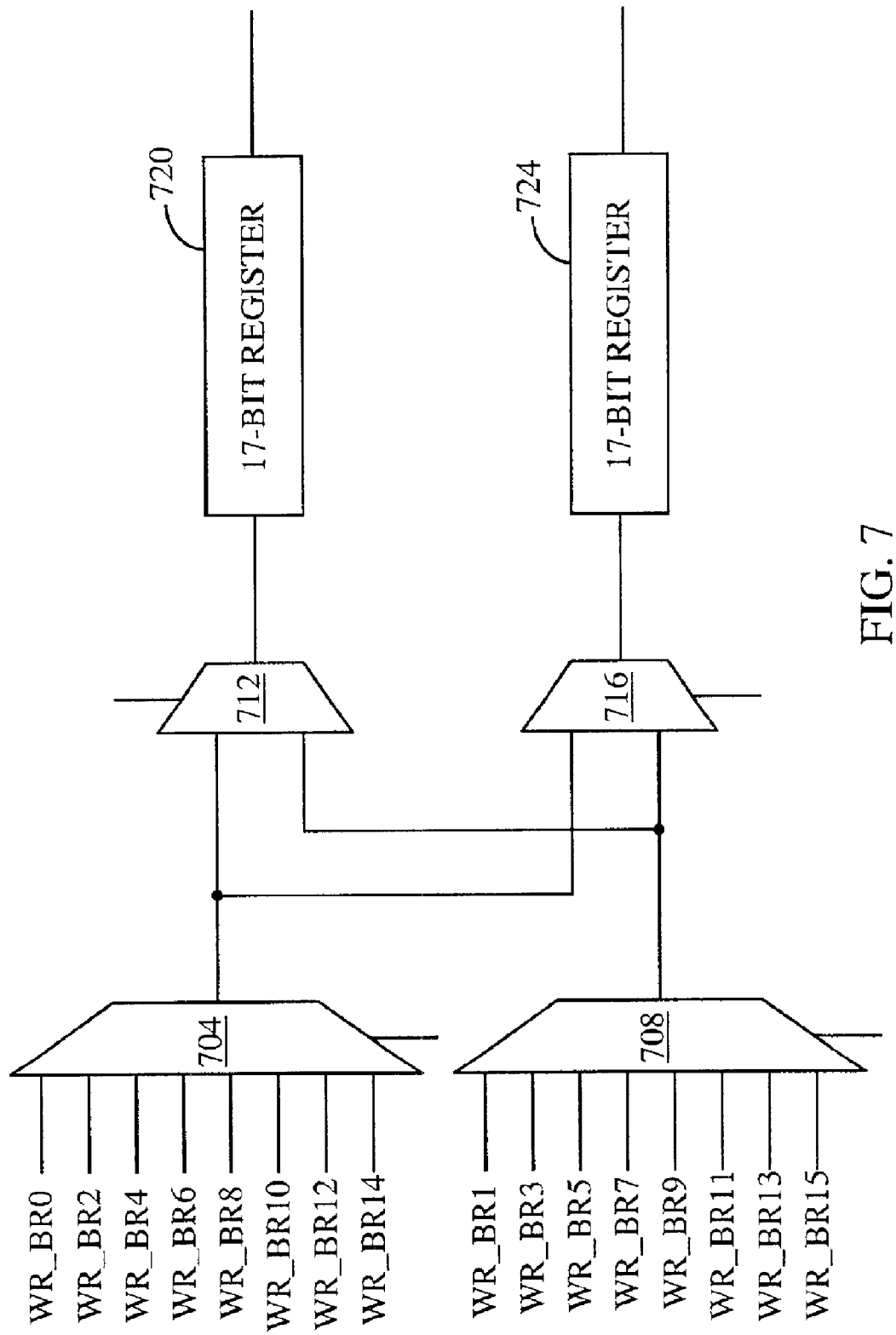
FIG. 7 illustrates a block diagram of a write multiplexer.

FIG. 7 illustrates a block diagram of a write multiplexer. As illustrated in FIG. 3, the even outputs of the intermediate data register 340 are input into a multiplexer 704, and the odd outputs of the intermediate data register 340 are input into a multiplexer 708. The data in each of the intermediate registers are resequenced by multiplexers 704, 708, 712 and 716 as controlled by the control sequencer 324 illustrated in FIG. 3, and stored in 17-bit registers 720 and 724, respectively. The resequenced data is then stored in the transpose RAM 304.

Figure 8:
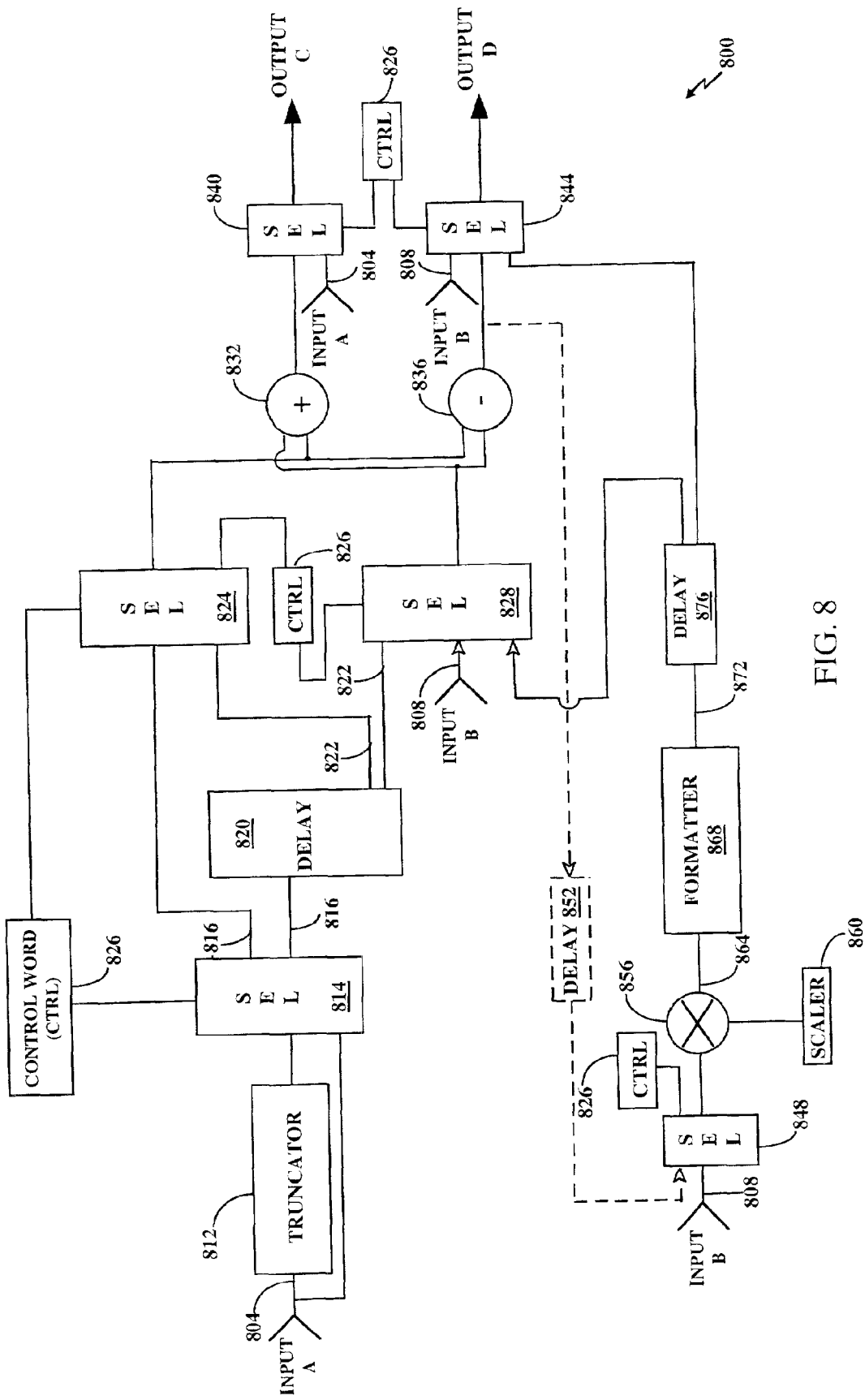
FIG. 8 illustrates a block diagram of a butterfly processor.

FIG. 8 illustrates operation of each butterfly processor 800. In an embodiment, four butterfly processors are implemented. However, it is contemplated that any number of butterfly processors may be implemented, subject to timing and size constraints. Data enters the butterfly through inputs 804 and 808. In an embodiment, input 804 sometimes represents the DC value, and passes through a truncator 812. The truncator 812 is responsible for the 1/N function, as described with respect to the two-dimensional DCT equation infra. The DC value of input 804 is seventeen bits—a single sign bit plus sixteen integer bits. The truncator 812 truncates n bits from the DC value input data to create a truncated DC value 816, where n is four bits if the data being processed is a 16×16 block, n is three bits if the data being processed is a 8×8 block, n is two bits if the data being processed is a 4×4 block, and n is one bit if the data being processed is a 2×2 block. If the input is an AC value, truncator 812 is bypassed and routed to a first selector 814. First selector 814 then selects either the truncated DC value 816 or the AC value from input A 804. In this embodiment, no fractional bits are used, although it is contemplated that fractional bits may be used.

The output of first selector 816 is routed to a delay 820 and a second selector 824. When the output of selector value 816 is routed to delay 820, the truncated DC value is may be held for a clock cycle before being routed to second selector 824. In an embodiment, delay 820 is a register. Selection of data in second selector 824 is a function of the type of mathematical operation that is to be performed on the data. A control word 826, preferably routed from the control sequencer, triggers second selector 824. As illustrated throughout FIG. 8, control word 826 provides control for a number of components. Again depending upon the type of mathematical operation to be performed, the data then passes to an adder 832 or a subtractor 836. A third selector 828 also receives the delayed output value from the delay 820, along with input 808. Again, selection of data in third selector 828 is a function of the type of mathematical operation that is to be performed on the data.

As the data is either added or subtracted, the data is then passed to either a fourth selector 840 or a fifth selector 844 for output from the butterfly processor 800. Input 804 is also passed to fourth selector 840, and input 808 is passed to fifth selector 844. In encode mode, the data may also be routed to sixth selector 848. In an embodiment, in encode mode, data is routed through an encode delay 852 before being routed to the sixth selector 848.

The second input, input 808, passes through the third selector 828 and the sixth selector 848. If input 808 is selected by sixth selector 848, the data is routed to a multiplier 856, where input 808 is multiplied by a scalar 860. The multiplication process with scalar 860 scales the data to produce a scaled output 864. In an embodiment, the scalar 860 is selected based on B. G. Lee's algorithm. In an embodiment, the scaled output 864 is then routed to a formatter 868. The formatter 868 rounds and saturates the data from a twenty-four bit format, a sign bit, sixteen integer bits and seven fractional bit, to a seventeen bit format. Thus, the formatted scaled output 872 is seventeen bits as opposed to twenty bits in length. Treatment of the data in this manner allows precision to be maintained when making calculations, but using fewer bits to represent the same data, which in turn saves hardware space. The formatted scaled output 872 is routed through a delay 876 to third selector 828 and fifth selector 844, for further processing.

Figure 9A:
FIG. 9a illustrates a No Operation configuration that may be performed by butterfly processor of FIG. 8.

FIGS. 9a–9f illustrate various mathematical operations capable of being performed by each butterfly processor. FIG. 9a illustrates a NO operation that may be performed by the butterfly processor 900. Given two inputs, input A (902) and input B (904), each input is simply passed through to output C (906) and output D (908). Accordingly, in a NO operation, C=A and D=B.

Figure 9B:
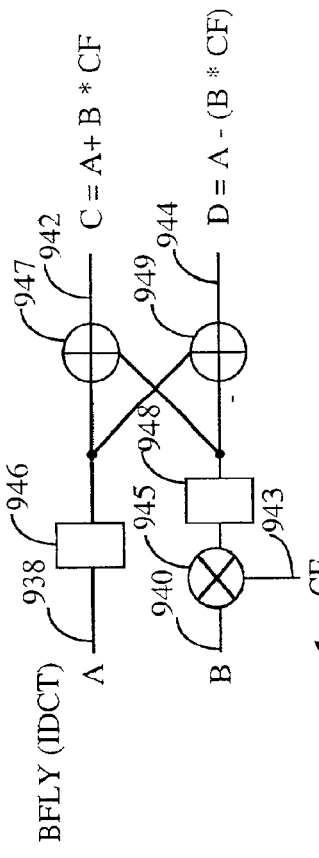
FIG. 9b illustrates an Accumulate Operation configuration that may be performed by butterfly processor of FIG. 8.

FIG. 9b illustrates an accumulate operation performed by the butterfly processor 910. Given two inputs, input A (912) and input B (914), output C (916) represents the sum of A+B. Input A (912) and input B (914) are combined by an adder 913. Output D (918) represents a pass through of input B (914). Accordingly, in an accumulate operation, C=A+B and D=B.

Figure 9C:
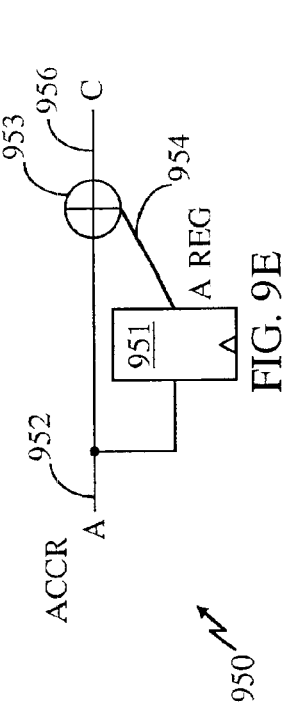
FIG. 9c illustrates a butterfly DCT Operation configuration that may be performed by butterfly processor of FIG. 8.

FIG. 9c illustrates a butterfly DCT operation performed by the butterfly processor 920. Given two inputs, input A (922) and input B (924), output C (926) represents the sum of input A (922) and input B (924), such that C=A+B. Input 922 and input 924 are combined by an adder 923. Output D (928) represents a subtracter of input A (922) and B (924) and multiplied by coefficient CF (930), such that the D=CF× (A−B). Input 924 is subtracted from input 922 by a subtractor 925, and then multiplied by a multiplier 927. Optionally, pipeline registers 932 and 934 may be used to temporarily store the intermediate product until the next clock cycle.

Figure 9D:
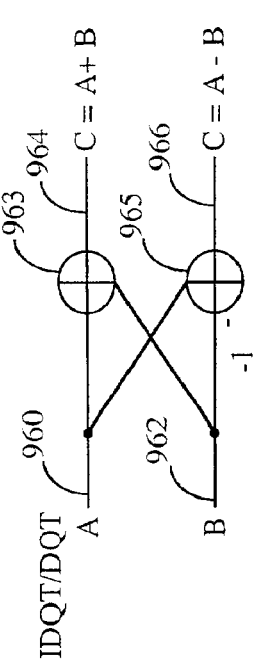
FIG. 9d illustrates a Butterfly IDCT Operation configuration that may be performed by butterfly processor of FIG. 8.

FIG. 9d illustrates a butterfly IDCT operation performed by the butterfly processor 936. Given two inputs, input A (938) and input B (940), the output C (942) represents the sum of input A (938) and input B (940) multiplied by a coefficient CF (943), such that the output C=A+(B×CF). Input B (940) is multiplied by coefficient CF (943) by multiplier 945, and then added to input A (938) by adder 947. Similarly, output D (944) represents the difference of input A (938) and input B (940) multiplied by a coefficient CF (943), such that D=A−(B×CF). Input B (940) is multiplied by coefficient CF (943) by multiplier 945, and then subtracted from input A (938) by subtractor 949. Optionally, pipeline registers 946 and 948 may store intermediate products to be computed in the next clock cycle.

Figure 9E:
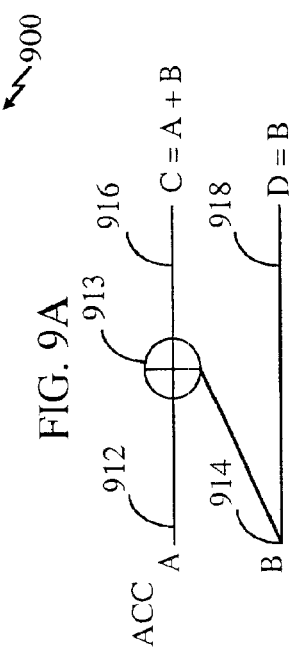
FIG. 9e illustrates an Accumulate Register Operation configuration that may be performed by butterfly processor of FIG. 8.

FIG. 9e illustrates an accumulate register operation performed by the butterfly processor 950. Given two inputs, input A (952) and input AREG (954), output C (956) represents the sum of input A and AREG such that C=A+AREG. As opposed to an input value, AREG may also be a value stored from a previous clock cycle in a register 951. Input A (952) is added to AREG (954) by adder 953.

Figure 9F:
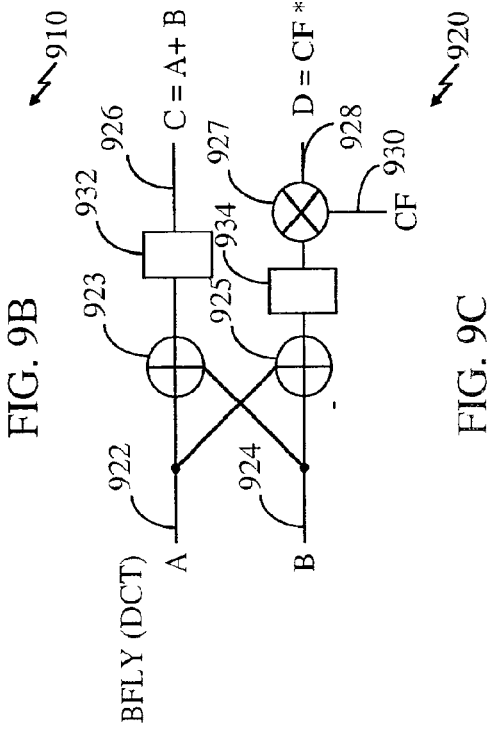
FIG. 9f illustrates a DQT/IDQT Operation configuration that may be performed by butterfly processor of FIG. 8.

FIG. 9f represents a DQT/IDQT operation performed by the butterfly processor 958. Given two inputs, input A (960) and input B (962), output C (964) represents the sum of inputs A and B, such that C=A+B. Similarly, output D (966) represents the difference of inputs A and B, such that D=A−B. Input A (960) and input B (962) are combined by an adder 963. Input B (962) is subtracted from input A (960) by a subtractor 965.

Figure 10:
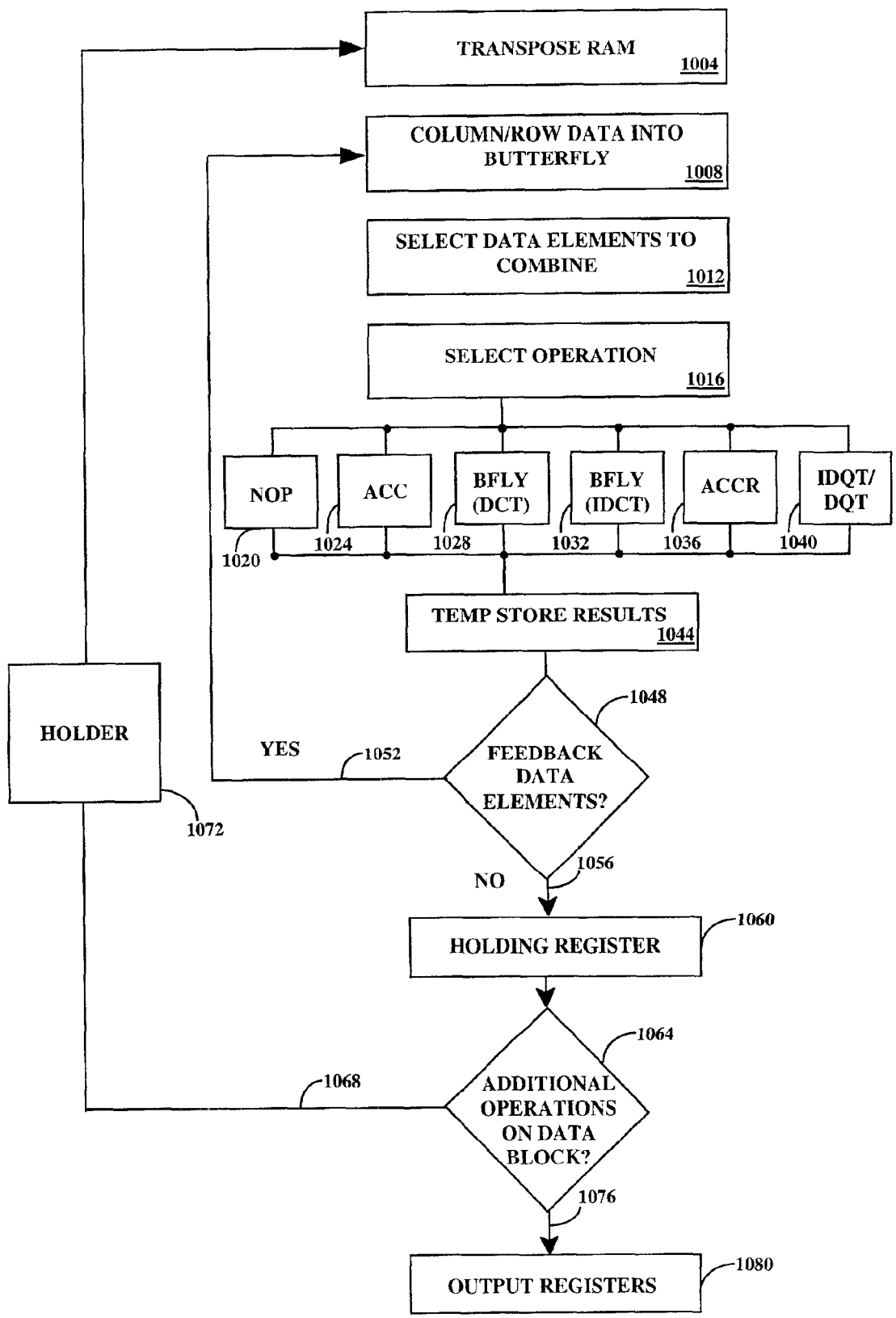
FIG. 10 illustrates a flowchart showing the process of calculating a transform, such as a discrete cosine transform (DCT) and a discrete quantization transform (DQT), embodying the invention.

The process of calculating a transform of image data 1000 is illustrated in FIG. 10, and may be implemented in a structure as described with respect to FIG. 3. The process is easily configured for frequency domain techniques such as the DCT, IDCT, DQT and IDQT. A column or row of data initially resides in a transpose RAM 1004 and is transferred into a holding register 1008 in the butterfly processor. Individual data elements of the block of data are selected to be combined 1012, and a mathematical operation to be performed on the individual data elements is selected 1016. Mathematical operations that may be performed are described with respect to FIG. 9a–9f, and include no operation 1020, an accumulate 1024, a DCT butterfly 1028, an IDCT butterfly 1032, an accumulate register 1036 and a DQT/IDQT butterfly 1040. The results of the mathematical operation are temporarily stored 1044. A feedback decision 1048 is then made based on whether further mathematical operations are needed. In an embodiment, the feedback decision is controlled by the control sequencer, as described with respect to FIG. 3. If the data is fed back 1052, the data is fed back to the holding register 1008, and the process is repeated. If the data is not fed back 1056, the data is transferred to an output holding register 1060. Another decision 1064 is made as to whether additional mathematical operations are needed for the column or row of data. If so (1068), the column or row of data is transferred to a holder 1072 and then written back into the transpose RAM 1004. If not (1076), the block of data is transferred to output data registers 1080.

As examples, the various illustrative logical blocks, flowcharts, and steps described in connection with the embodiments disclosed herein may be implemented or performed in hardware or software with an application-specific integrated circuit (ASIC), a programmable logic device, discrete gate or transistor logic, discrete hardware components, such as, e.g., registers and FIFO, a processor executing a set of firmware instructions, any conventional programmable software and a processor, or any combination thereof. The processor may advantageously be a microprocessor, but in the alternative, the processor may be any conventional processor, controller, microcontroller, or state machine. The software could reside in RAM memory, flash memory, ROM memory, registers, hard disk, a removable disk, a CD-ROM, a DVD-ROM or any other form of storage medium known in the art.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What we claim as our invention is:

1. An apparatus to determine a transform of a block of encoded data, the block of encoded data comprising a plurality of data elements, the apparatus comprising:

an input register configured to receive a predetermined quantity of data elements;

at least one butterfly processor coupled to the input register, the butterfly processor configured to perform at least one mathematical operation on selected pairs of data elements to produce an output of processed data elements;

at least one intermediate register coupled to the butterfly processor, the intermediate register configured to temporarily store the processed data; and a feedback loop coupling the intermediate register and the butterfly processor, where if enabled, is configured to transfer a first portion of processed data elements to the appropriate butterfly processor to perform additional mathematical operations and, where if disabled, is configured to transfer a second portion of processed data elements to at least one holding register;

wherein the holding register is configured to store the processed data until all of the first portion data elements is processed.

2. The apparatus set forth in claim 1, further comprising at least one input multiplexer coupling the feedback loop and the intermediate register, wherein each input multiplexer is configured to temporarily select data elements and transfer data elements to the appropriate butterfly processor.

3. The apparatus set forth in claim 1, further comprising at least one output multiplexer coupling the butterfly processor and the intermediate register, wherein each output multiplexer is configured to temporarily select data elements and transfer data elements to the appropriate intermediate register.

4. The apparatus set forth in claim 1, wherein the transform is selected from the group consisting of: a Discrete Cosine Transform (DCT), a Differential Quadtree Transform (DQT), an Inverse Discrete Cosine Transform (IDCT) and an Inverse Differential Quadtree Transform (IDQT).

5. The apparatus set forth in claim 1 wherein the block of encoded data may be represented as row data and column data, and further comprising a transpose random-access memory (RAM) coupled to the input register, wherein the transpose RAM is configured to store the row data while the column data is being processed, and wherein the transpose RAM is configured to store the column data while the row data is being processed.

6. The apparatus set forth in claim 5, wherein the transpose RAM is configurable to store two blocks of encoded data.

7. The apparatus set forth in claim 5, further comprising a write multiplexer coupling the holding register, wherein the write multiplexer is configured to resequence data elements to complete a one-dimensional transform.

8. The apparatus set forth in claim 1 wherein the feedback loop allows for the same components to be reused irrespective of block size.

9. The apparatus set forth in claim 1 wherein the feedback loop allows for the same components to be reused irrespective of the type of transform.

10. The apparatus set forth in claim 1 wherein the feedback loop allows for the same components to be reused irrespective of mathematical operation.

11. The apparatus set forth in claim 1, further comprising a control sequencer coupled to the feedback loop, wherein the control sequencer is configured to enable or disable the feedback loop.

12. The apparatus set forth in claim 11, where the control sequencer provides the butterfly processor with a unique coefficient multiplier.

13. The apparatus set forth in claim 12, wherein the unique coefficient multiplier is based on B. G. Lee's algorithm.

14. The apparatus set forth in claim 11, where the control sequencer enables certain ones of the input registers based on a predetermined event.

15. The apparatus set forth in claim 11, where the control sequencer enables certain ones of the butterfly processors based on predetermined criteria.

16. The apparatus set forth in claim 11, where the control sequencer enables certain ones of the intermediate registers based on predetermined criteria.

17. The apparatus set forth in claim 11, where the control sequencer enables certain ones of the output registers based on predetermined criteria.

18. The apparatus as set forth in claim 1, wherein the mathematical operation is from the group consisting of addition, multiplication, and subtraction.

19. The apparatus as set forth in claim 1, wherein each butterfly processor performs a portion of a one-dimensional transform.

20. The apparatus as set forth in claim 1, wherein the transform of a block of encoded data is computed as a series of one-dimensional transforms.

21. An apparatus to determine a transform of a block of encoded data, the block of encoded data capable of being represented as row data and column data, each row and column comprising a plurality of data elements, the apparatus comprising:

a transpose random access memory (RAM) configured to store the block of encoded data;

at least one input register coupled to the transpose RAM, the input register configured to receive columns of data from the transpose RAM;

at least one butterfly processor coupled to the input register, the butterfly processor configured to perform a portion of a one-dimensional transform on selected pairs of data elements from the column data to produce an output of first order column data;

at least one intermediate register coupled to the butterfly processor, the intermediate register configured to temporarily store the first order column data; and a feedback loop coupling the intermediate register and the butterfly processor, where if enabled, is configured to transfer selected data elements of the first order column data to the butterfly processor to perform additional portions of one-dimensional transforms and, where if disabled, is configured to transfer the column data to the transpose RAM;

wherein the input register is then configured to receive rows of data from the transpose RAM, the butterfly processor is configured to perform a portion of a one dimensional transform on selected pairs of data elements from the rows of data to produce an output of first order row data, the intermediate register configured to temporarily store the first order row data, the feedback loop configured to transfer selected data elements of the first order row data to the butterfly processor to perform additional portions of one-dimensional transforms and, where if disabled, is configured to transfer the row data to an output register.

22. The apparatus as set forth in claim 21, wherein feedback loop is disabled upon completing a one-dimensional transform on the column or row data.

23. The apparatus set forth in claim 21, further comprising at least one input multiplexer coupling the feedback loop and the intermediate register, wherein each input multiplexer is configured to temporarily select data elements and transfer data elements to the appropriate butterfly processor.

24. The apparatus set forth in claim 21, further comprising at least one output multiplexer coupling the butterfly processor and the intermediate register, wherein each output multiplexer is configured to temporarily select data elements and transfer data elements to the appropriate intermediate register.

25. The apparatus set forth in claim 21, wherein the transform is selected from the group consisting of: a Discrete Cosine Transform (DCT), a Differential Quadtree Transform (DQT), an Inverse Discrete Cosine Transform (IDCT) and an Inverse Differential Quadtree Transform (IDQT).

26. The apparatus set forth in claim 21, wherein the transpose RAM is configurable to store two blocks of encoded data.

27. The apparatus set forth in claim 21, further comprising a write multiplexer coupling the holding register, wherein the write multiplexer is configured to resequence data elements such that the one-dimensional transform is completed.

28. The apparatus set forth in claim 21 wherein the feedback loop allows for the same components to be reused irrespective of block size, type of transform or type of mathematical operation.

29. The apparatus set forth in claim 21, further comprising a control sequencer coupled to the feedback loop, wherein the control sequencer is configured to enable or disable the feedback loop.

30. The apparatus set forth in claim 29, where the control sequencer provides the butterfly processor with a unique coefficient multiplier.

31. The apparatus set forth in claim 29, wherein the unique coefficient multiplier is based on B. G. Lee's algorithm.

32. The apparatus set forth in claim 29, where the control sequencer enables certain ones of the input registers, butterfly processors, intermediate registers, or output registers based on predetermined criteria.

33. The apparatus as set forth in claim 21, wherein the mathematical operation is from the group consisting of addition, multiplication, and subtraction.

34. The apparatus as set forth in claim 21, wherein each butterfly processor performs a portion of a one-dimensional transform.

35. The apparatus as set forth in claim 21, wherein the transform of a block of encoded data is computed as a series of one-dimensional transforms.

36. An apparatus to perform an N dimensional transform as a cascade of N one-dimensional transforms on a block of encoded data, the encoded data comprising a plurality of data elements, the apparatus comprising:
    a cluster of butterfly processors coupled to the input register, each butterfly processor configured to perform a portion of a one-dimensional transform on selected pairs of data elements to produce an output of partially processed data comprising a plurality of partially processed data elements;
    at least one intermediate register coupled to each butterfly processor, the intermediate register configured to temporarily store the partially processed data; and
    a feedback loop coupled to the intermediate register and the butterfly processor, where the feedback loop is enabled as necessary to route selected pairs of the partially processed data elements to the appropriate butterfly processor to perform additional portions of one-dimensional transforms until a one dimensional transform is completed.

37. The apparatus set forth in claim 36, wherein the transform is selected from the group consisting of: a Discrete Cosine Transform (DCT), a Differential Quadtree Transform (DQT), an Inverse Discrete Cosine Transform (IDCT) and an Inverse Differential Quadtree Transform (IDQT).

38. The apparatus set forth in claim 36 wherein the block of encoded data may be represented as row data and column data, and further comprising a transpose read-only memory (RAM) coupled to the input register, wherein the transpose RAM is configured to store the row data while the column data is being processed, and wherein the transpose RAM is configured to store the column data while the row data is being processed.

39. The apparatus set forth in claim 38, wherein the transpose RAM is configurable to store two blocks of encoded data.

40. The apparatus set forth in claim 36 wherein the feedback loop allows for the same components to be reused irrespective of block size, type of transform or type of mathematical operation.

41. The apparatus set forth in claim 36, further comprising a control sequencer coupled to the feedback loop, wherein the control sequencer is configured to enable or disable the feedback loop.

42. The apparatus set forth in claim 41, where the control sequencer provides the butterfly processor with a unique coefficient multiplier.

43. The apparatus set forth in claim 42, wherein the unique coefficient multiplier is based on B. G. Lee's algorithm.

44. The apparatus set forth in claim 41, where the control sequencer enables certain ones of the input registers, butterfly processors, intermediate registers, or output registers based on predetermined criteria.

45. An apparatus to determine the inverse discrete cosine transform of a block of encoded data, the block of encoded data comprising a plurality of data elements, the apparatus comprising:
    an input register configured to receive a predetermined quantity of data elements;
    at least one butterfly processor coupled to the input register, the butterfly processor configured to perform at least one mathematical operation on selected pairs of data elements to produce an output of processed data elements;
    at least one intermediate register coupled to the butterfly processor, the intermediate register configured to temporarily store the processed data; and
    a feedback loop coupling the intermediate register and the butterfly processor, where if enabled, is configured to transfer a first portion of processed data elements to the appropriate butterfly processor to perform additional mathematical operations and, where if disabled, is configured to transfer a second portion of processed data elements to at least one holding register;
    wherein the holding register is configured to store the processed data until all of the first portion data elements is processed.

46. An apparatus to determine a transform of a block of encoded data, the block of encoded data capable of being represented as row data and column data, each row and column comprising a plurality of data elements, the apparatus comprising:
    a transpose random-access memory (RAM) configured to store the block of encoded data;
    at least one input register coupled to the transpose RAM, the input register configured to receive columns of data from the transpose RAM;
    at least one butterfly processor coupled to the input register, the butterfly processor configured to perform a first order transform on selected pairs of data elements from the column data to produce an output of first order column data;
    at least one intermediate register coupled to the butterfly processor, the intermediate register configured to temporarily store the first order column data;
    a feedback loop coupling the intermediate register and the butterfly processor, where if enabled, is configured to transfer selected data elements of the first order column data to the butterfly processor to perform additional transforms and, where if disabled, is configured to transfer the column data to the transpose RAM; and
    a control sequencer coupled to the feedback loop, wherein the control sequencer is configured to enable or disable the feedback loop
    wherein the input register is then configured to receive rows of data from the transpose RAM, the butterfly processor is configured to perform a first order transform on selected pairs of data elements from the rows of data to produce an output of first order row data, the intermediate register is configured to temporarily store the first order row data, the feedback loop is configured to transfer selected data elements of the first order row data to the butterfly processor to perform additional transforms and, where if disabled, is configured to transfer the row data to an output register.

47. A method to determine a transform of a block of encoded data, the block of encoded data comprising a plurality of data elements, the method comprising:
    (a) receiving a predetermined quantity of data elements;
    (b) performing at least one mathematical operation on selected pairs of data elements to produce an output of processed data elements;

(c) making a determination as to whether any of the processed data elements require additional mathematical operations;

(d) selecting a first portion of processed data elements that require additional mathematical operations;

(e) selecting a second portion of processed data elements that do not require additional mathematical operations;

(f) performing at least one mathematical operation on selected pairs of the first portion of processed data elements to produce a second output of processed data elements; and (g) storing the second portion of processed data elements until all of the first portion of data elements is processed.

48. The method set forth in claim 47, further comprising:
(h) repeating steps (c), (d), (e), (f) and (g) as necessary.

49. The method set forth in claim 47, further comprising:
(i) outputting the block of encoded data when all of the data elements of the block of encoded data do not require additional mathematical operations.

50. The method set forth in claim 47, wherein the transform is selected from the group consisting of: a Discrete Cosine Transform (DCT), a Differential Quadtree Transform (DQT), an Inverse Discrete Cosine Transform (IDCT) and an Inverse Differential Quadtree Transform (IDQT).

51. The method set forth in claim 47 wherein the block of encoded data may be represented as row data and column data, and further comprising:

storing the row data while the column data is being processed; and storing the column data while the row data is being processed.

52. The method set forth in claim 47, further comprising resequencing data elements before the step of storing, such that subsequent delivery of data elements is performed in an efficient manner.

53. The method set forth in claim 47, further comprising controlling steps (a), (b), (c), (d), (e), (f), (g), and (h) based upon predetermined criteria.

54. The method set forth in claim 53, further comprising providing a unique coefficient multiplier to certain data elements based upon predetermined criteria.

55. The apparatus set forth in claim 54, wherein the unique coefficient multiplier is based on B. G. Lee's algorithm.

56. The method set forth in claim 47, wherein the mathematical operation is from the group consisting of addition, multiplication, and subtraction.

57. The method as set forth in claim 47, wherein each butterfly processor performs a portion of a one-dimensional transform.

58. The method as set forth in claim 47, wherein the transform of a block of encoded data is computed as a series of one-dimensional transforms.

59. A computer readable medium containing constructions for controlling a computer system to perform a method, the method comprising:

(a) receiving a predetermined quantity of data elements;

(b) performing at least one mathematical operation on selected pairs of data elements to produce an output of processed data elements;

(c) making a determination as to whether any of the processed data elements require additional mathematical operations;

(d) selecting a first portion of processed data elements that require additional mathematical operations;

(e) selecting a second portion of processed data elements that do not require additional mathematical operations;

(f) performing at least one mathematical operation on selected pairs of the first portion of processed data elements to produce a second output of processed data elements; and (g) storing the second portion of processed data elements until all of the first portion of data elements is processed.

60. An apparatus to determine a transform of a block of encoded data, the block of encoded data comprising a plurality of data elements, the apparatus comprising:

(a) means for receiving a predetermined quantity of data elements;

(b) means for performing at least one mathematical operation on selected pairs of data elements to produce an output of processed data elements;

(c) means for making a determination as to whether any of the processed data elements require additional mathematical operations;

(d) means for selecting a first portion of processed data elements that require additional mathematical operations;

(e) means for selecting a second portion of processed data elements that do not require additional mathematical operations;

(f) means for performing at least one mathematical operation on selected pairs of the first portion of processed data elements to produce a second output of processed data elements; and (g) means for storing the second portion of processed data elements until all of the first portion of data elements is processed.

61. The apparatus set forth in claim 47, further comprising:
(h) means for repeating steps (c), (d), (e), (f) and (g) as necessary.

62. The apparatus set forth in claim 47, further comprising:
(i) means for outputting the block of encoded data when all of the data elements of the block of encoded data do not require additional mathematical operations.

63. The apparatus set forth in claim 47, wherein the transform is selected from the group consisting of: a Discrete Cosine Transform (DCT), a Differential Quadtree Transform (DQT), an Inverse Discrete Cosine Transform (IDCT) and an Inverse Differential Quadtree Transform (IDQT).

64. The apparatus set forth in claim 47 wherein the block of encoded data may be represented as row data and column data, and further comprising:

means for storing the row data while the column data is being processed; and means for storing the column data while the row data is being processed.

65. The apparatus set forth in claim 47, further comprising means for resequencing data elements before the step of storing, such that subsequent delivery of data elements is performed in an efficient manner.

66. The apparatus set forth in claim 47, further comprising means for controlling elements (a), (b), (c), (d), (e), (f), (g), and (h) based upon predetermined criteria.

67. The apparatus set forth in claim 66, further comprising providing a unique coefficient multiplier to certain data elements based upon predetermined criteria.

68. The apparatus set forth in claim 67, wherein the unique coefficient multiplier is based on B. G. Lee's algorithm.

69. The apparatus set forth in claim 60, wherein the mathematical operation is from the group consisting of addition, multiplication, and subtraction.

70. The apparatus as set forth in claim 60, wherein each butterfly processor performs a portion of a one-dimensional transform.

71. An apparatus to determine a transform of encoded data, the encoded data comprising a plurality of data elements in the pixel domain, the apparatus comprising:
- a block size assigner configured to receive the plurality of data elements and group the elements into a plurality of groups of data elements in the pixel domain;
- a DCT/DQT transformer configured to transform the data elements from the pixel domain to the frequency domain, the transformer further comprising:
    - an input register configured to receive a predetermined quantity of data elements of the group;
    - at least one butterfly processor coupled to the input register, the butterfly processor configured to perform at least one mathematical operation on selected pairs of data elements to produce an output of processed data elements;
    - at least one intermediate register coupled to the butterfly processor, the intermediate register configured to temporarily store the processed data; and
    - a feedback loop coupling the intermediate register and the butterfly processor, where if enabled, is configured to transfer a first portion of processed data elements to the appropriate butterfly processor to perform additional mathematical operations and, where if disabled, is configured to transfer a second portion of processed data elements to at least one holding register;
    - wherein the holding register is configured to store the processed data until all of the first portion data elements is processed;
- a quantizer configured to quantize the frequency domain elements to emphasize those elements that are more sensitive to the human visual system, and de-emphasize those elements that are less sensitive to the human visual system;
- a serializer configured to produce a serialized stream of frequency domain elements; and
- a variable length coder configured to determine successive frequency domain elements and non-successive frequency domain elements.

72. The apparatus set forth in claim 71, further comprising at least one input multiplexer coupling the feedback loop and the intermediate register, wherein each input multiplexer is configured to temporarily select data elements and transfer data elements to the appropriate butterfly processor.

73. The apparatus set forth in claim 71, further comprising at least one output multiplexer coupling the butterfly processor and the intermediate register, wherein each output multiplexer is configured to temporarily select data elements and transfer data elements to the appropriate intermediate register.

74. The apparatus set forth in claim 71 wherein the block of encoded data may be represented as row data and column data, and further comprising a transpose random-access memory (RAM) coupled to the input register, wherein the transpose RAM is configured to store the row data while the column data is being processed, and wherein the transpose RAM is configured to store the column data while the row data is being processed.

75. The apparatus set forth in claim 74, wherein the transpose RAM is configurable to store two blocks of encoded data.

76. The apparatus set forth in claim 74, further comprising a write multiplexer coupling the holding register, wherein the write multiplexer is configured to resequence data elements to complete a one-dimensional transform.

77. The apparatus set forth in claim 71 wherein the feedback loop allows for the same components to be reused irrespective of block size.

78. The apparatus set forth in claim 71, further comprising a control sequencer coupled to the feedback loop, wherein the control sequencer is configured to enable or disable the feedback loop.

79. The apparatus set forth in claim 78, where the control sequencer provides the butterfly processor with a unique coefficient multiplier.

80. The apparatus set forth in claim 78, where the control sequencer enables certain ones of the input registers based on a predetermined event.

81. The apparatus set forth in claim 78, where the control sequencer enables certain ones of the butterfly processors based on predetermined criteria.

82. The apparatus set forth in claim 78, where the control sequencer enables certain ones of the intermediate registers based on predetermined criteria.

83. The apparatus set forth in claim 78, where the control sequencer enables certain ones of the output registers based on predetermined criteria.

84. The apparatus as set forth in claim 71, wherein the mathematical operation is from the group consisting of addition, multiplication, and subtraction.

85. The apparatus as set forth in claim 71, wherein each butterfly processor performs a portion of a one-dimensional transform.

86. A method of transforming encoded data from the pixel domain to the frequency domain, the encoded data comprising a plurality of data elements, the method comprising:
- (a) grouping the plurality of data elements in the pixel domain into a plurality of blocks, each block comprising a plurality of data elements in the pixel domain;
- (b) performing at least one mathematical operation on selected pairs of data elements to produce an output of processed data elements;
- (c) making a determination as to whether any of the processed data elements require additional mathematical operations;
- (d) selecting a first portion of processed data elements that require additional mathematical operations;
- (e) selecting a second portion of processed data elements that do not require additional mathematical operations;
- (f) performing at least one mathematical operation on selected pairs of the first portion of processed data elements to produce a second output of processed data elements;
- (g) storing the second portion of processed data elements until all of the first portion of data elements is processed;
- (h) repeating steps (c), (d), (e), (f) and (g), as necessary, until all of the data elements do not require additional mathematical operations and are converted to frequency domain elements;
- (i) quantizing the frequency domain data elements to emphasize those elements that are more sensitive to the human visual system and de-emphasize those elements that are less sensitive to the human visual system;

(j) serializing the quantized frequency domain data elements to produce a serialized stream of frequency domain elements; and (k) coding the serialized frequency domain elements to determine successive frequency domain elements and non-successive frequency domain elements.

87. The method set forth in claim 86 wherein the block of encoded data may be represented as row data and column data, and further comprising:

storing the row data while the column data is being processed; and storing the column data while the row data is being processed.

88. The method set forth in claim 86, further comprising controlling steps (a), (b), (c), (d), (e), (f), (g), and (h) based upon required control signals.

89. The method set forth in claim 88, further comprising providing a unique coefficient multiplier to certain data elements based upon predetermined criteria.

90. The method as set forth in claim 86, wherein each butterfly processor performs a portion of a one-dimensional transform.

91. The method as set forth in claim 86, wherein the transform of a block of encoded data is computed as a series of one-dimensional transforms.

* * * * *